(12) United States Patent
B'Far et al.

(10) Patent No.: US 8,560,491 B2
(45) Date of Patent: Oct. 15, 2013

(54) MASSIVELY SCALABLE REASONING ARCHITECTURE

(75) Inventors: Reza B'Far, Huntington Beach, CA (US); Ryan Golden, Austin, TX (US); Yasin Cengiz, Santa Ana, CA (US); Tsai-Ming Tseng, Santa Ana, CA (US); Sreedhar Chitullapally, Irvine, CA (US)

(73) Assignee: Oracle International Corporation, Redwood Shores, CA (US)

( * ) Notice: Subject to any disclaimer, the term of this patent is extended or adjusted under 35 U.S.C. 154(b) by 263 days.

(21) Appl. No.: 12/874,821

(22) Filed: Sep. 2, 2010

(65) Prior Publication Data

US 2011/0093430 A1    Apr. 21, 2011

Related U.S. Application Data

(60) Provisional application No. 61/253,054, filed on Oct. 19, 2009.

(51) Int. Cl.
*G06N 5/02* (2006.01)

(52) U.S. Cl.
USPC .......................................................... 706/55

(58) Field of Classification Search
USPC .................................... 706/14, 55; 700/246
See application file for complete search history.

(56) References Cited

U.S. PATENT DOCUMENTS

| | | | |
|---|---|---|---|
| 7,792,783 B2 | 9/2010 | Friedlander et al. | |
| 2005/0149230 A1* | 7/2005 | Gupta et al. | 700/246 |
| 2007/0011175 A1 | 1/2007 | Langseth et al. | |
| 2007/0124263 A1* | 5/2007 | Katariya et al. | 706/14 |
| 2007/0239666 A1 | 10/2007 | Garcia | |
| 2008/0256121 A1 | 10/2008 | Liu et al. | |

OTHER PUBLICATIONS

Astrova, et al., "Rule-Based Transformation of SQL Relational Databases to OWL Ontologies," $2^{nd}$ International Conference on Metadata and Semantics Research, 16pp. (Oct. 2007).

B'Far, et al., "SDR: An Architectural Approach to Distribution of Complex Ontology Processing," *Proc. SWWS*, pp. 10-18 (2009).

Calvanese, et al., "Tailoring OWL for Data Intensive Ontologies," *Proceedings of the OWL: Experiences and Directions Workshop*, 10pp. (2005).

Clark & Parsia, LLC, "Introducing Pronto: Probabilistic DL Reasoning in Pellet". [Online] 2007 [retrieved on Jul. 11, 2012]. Retrieved from the Internet: <URL: http://weblog.clarkparsia.com/2007/09/27/introducing-pronto>.

Codd, E. F., "A Relational Model of Data for Large Shared Data Banks," *Communications of the ACM*, vol. 13, No. 6, pp. 377-387 (Jun. 1970).

(Continued)

*Primary Examiner* — Jeffrey A Gaffin
*Assistant Examiner* — Ola Olude Afolabi
(74) *Attorney, Agent, or Firm* — Kilpatrick, Townsend & Stockton, LLP

(57) ABSTRACT

Techniques for reasoning data are disclosed. The techniques may include storing data in a data store which may be a semantic data store. A plurality of reasoning modules are used to reason the data in order to detect violations of one or more business policies. The reasoning modules may include semantic reasoning modules and/or pattern-based reasoning modules. Results of reasoning the data may be displayed to one or more users.

22 Claims, 11 Drawing Sheets

(56) References Cited

OTHER PUBLICATIONS

Dean, Jeffery and Sanjay Ghemawat, "MapReduce: Simplified Data Processing on Large Clusters," Sixth Symposium on Operating Systems Design and Implementation, 15 pp. (2004).
Dean, Mike and Guus Schreiber, eds., "Web Ontology Language Reference," WC3 Recommendation, http://www.w3.org/TR/owl-ref/, 55pp. (Feb. 10, 2004).
Friedman-Hill, Ernest, "Jess®: The Rule Engine for the Java™ Platform," Version 7.1p2 [online] 2008 [retrieved on Jul. 11, 2012]. Retrieved from the Internet: <URL: http://www.jessrules.com/jess/docs/Jess71p2.pdf>.
Oxford English Dictionary, "Definition of 'Semantic'," Oxford English Dictionary Online, http://oxforddictionaries.com/definitions/semantic, 1pp. (Jun. 9, 2011).
Park, et al, "An Efficient and Scalable Management of Ontology," Proceedings of the 12th International Conference of Database Systems for Advanced Applications, *Lecture Notes on Computer Sciences*, vol. 4443, pp. 975-980 (Apr. 2007).
Reiter, R., "On Closed World Data Bases," in *Logic and Data Bases*, Gallaire & Minker, eds., pp. 55-76, Plenum Press: New York (1978).
Sequeda et al, "A Bootstrapping Architecture for Integration of Relational Database to the Semantic Web," *Proceedings of the Poster and Demonstration Session at the 7th International Semantic Web Conference*(ISWC), 2 pp. (2008).
Shen, et al., "Research on Rules of Mapping from Relational Model to OWL," *Proceedings of OWLED '06*, 9pp. Athens, Georgia (Nov. 2006).
Soma et al., "Parallel Inferencing for OWL Knowledge Bases" [online] 2008 [retrieved on Jun. 14, 2012]. Retrieved from the Internet: <URL: http://halcyon.usc.edu/~pk/prasannawebsite/papers/ram_icpp08.pdf>.
Tirmizi et al, "Translating Sql Applications to the Semantic Web," *Proceedings of the 19th International Conference on Database and Expert Systems Applications*, 2 pp. (2008).
SAAD, Yousef. *Iterative Methods for Sparse Linear Systems.* [online]. 2000 [retrieved on Nov. 26, 2012]. Retrieved from the Internet: <URL: http://www.stanford.edu/class/cme324/saad.pdf>.
U.S. Appl. No. 12/576,176, Final Office Action mailed on Jan. 16, 2013, 12 Pages.
Soma, et al., A Data Partitioning Approach for Parallelizing Rule Based Inferencing for Materialized OWL Knowledge Bases [online]. University of Southern California, 2008 [retrieved on Jan. 9, 2013]. Retrieved from the Internet: <URL: http://pgroup.usc.edu/pgroupW/images/4/4a/Paper_2008_6.pdf>.
Sonia, Kiran and Sharifullah Khan, "R2o Transformation System: Relation to Ontology Transformation for Scalable Data Integration," *Proceedings of the 2008 International Symposium on Database Engineering*, 5 pp. (2008).

\* cited by examiner

FIG. 6
$$600 \begin{bmatrix} & A & B & C & D & E & F & G & H & I & J \\ & 1 & 1 & 1 & 0 & 1 & 1 & 1 & 1 & 0 & 1 \\ & 1 & 1 & 1 & 0 & 1 & 1 & 1 & 0 & 1 & 0 \\ & 1 & 0 & 1 & 1 & 1 & 1 & 1 & 0 & 1 & 0 \\ & 1 & 0 & 1 & 1 & 1 & 1 & 1 & 1 & 0 & 1 \\ & 1 & 0 & 0 & 1 & 1 & 1 & 1 & 1 & 0 & 1 \\ & 1 & 0 & 0 & 1 & 1 & 1 & 1 & 0 & 1 & 0 \\ & 0 & 1 & 1 & 0 & 1 & 1 & 1 & 0 & 1 & 0 \\ & 0 & 1 & 1 & 0 & 1 & 1 & 1 & 1 & 0 & 1 \\ & 0 & 0 & 1 & 0 & 1 & 1 & 1 & 1 & 0 & 1 \\ & 0 & 0 & 1 & 0 & 1 & 1 & 1 & 0 & 1 & 0 \end{bmatrix}$$
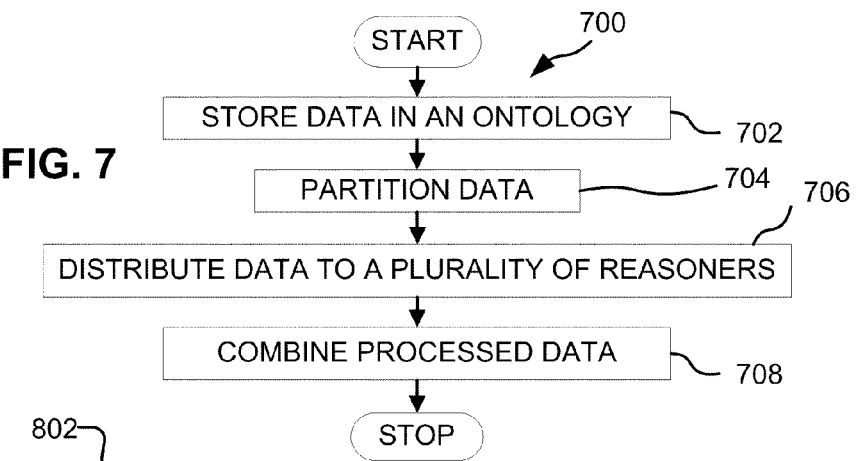
FIG. 7
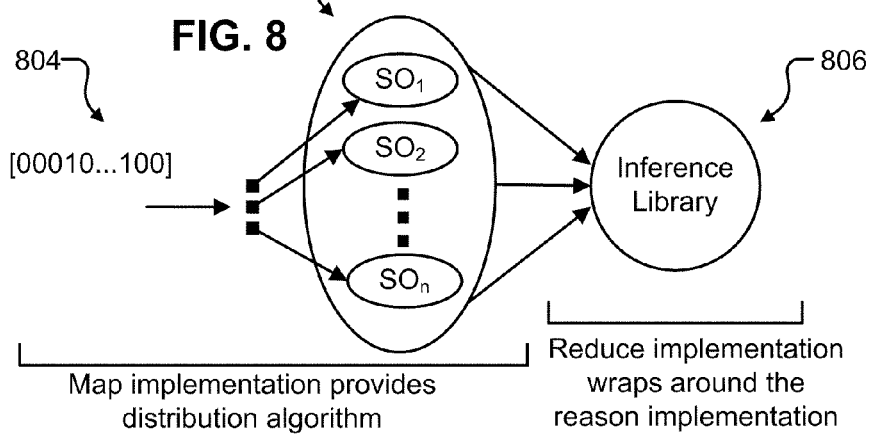
FIG. 8

MASSIVELY SCALABLE REASONING ARCHITECTURE

CROSS-REFERENCES TO RELATED APPLICATIONS

The present application claims the benefit of priority under 35 U.S.C. §119(e) of U.S. Provisional Application No. 61/253,054, filed on Oct. 19, 2009, the full disclosure of which is incorporated herein by reference for all purposes. This application incorporates by reference for all purposes co-pending U.S. patent application Ser. No. 12/576,176, filed on Oct. 8, 2009, entitled "Techniques for Processing Ontologies," and U.S. patent application Ser. No. 12/581,804, filed on Oct. 19, 2009, entitled "Techniques for Extracting Semantic Data Stores."

BACKGROUND OF THE INVENTION

Businesses often have internal business policies intended to address a wide range of issues such as security, privacy, trade secrets, criminal activity of employees or others with access to the business, and many others. These business policies address various aspects of a business, such as purchasing, selling, marketing, and internal administration. Because of the large number of activities occurring during the course of running a business, which may have various entities located in a variety of geographical locations, it is often impractical to manually monitor all activities in which improper behavior or mistakes may occur.

One approach to implementing business policies has been to monitor and control computer systems used to facilitate a business' activities. For example, information regarding various activities, such as sales and payroll, are often stored in one or more data stores. This information may be analyzed to find activity that might be in violation of a business policy, such as an item on an invoice or paycheck to an employee being outside of a specified range, or a particular employee attempting to access information to which he or she is not entitled access.

One approach to monitoring and controlling a business' computer systems involves storing business data in one or more ontologies. With the advent of semantic technologies, the importance of ontologies and semantic query languages has grown manifold. An ontology is a formal representation of knowledge, specifically a formal representation of a set of concepts within a domain and relationships between the concepts. Ontologies are used in several different areas including business analytics, enterprise systems, artificial intelligence and the like, and have the potential to be used in several other fields and applications.

An ontology is typically encoded using an ontology language. Several ontology languages are available. The OWL Web Ontology Language has become the industry standard for representing web ontologies. OWL can be used to explicitly represent the meaning of terms in vocabularies and the relationships between the terms. OWL thus provides facilities for expressing meaning and semantics that goes far beyond the capabilities of languages such as XML. OWL is being developed by the Web Ontology Working Group as part of the W3C Semantic Web Activity. Further information related to OWL may be found at the W3C website.

An ontology may be persisted in memory such as in a database or other data store. There are several standard ways of querying and manipulating the data in an ontology using query languages such as RDQL (Resource Description Format Query Language), OWL-QL, SPARQL (SPARQL Protocol and RDF Query Language), and others. Among the ontology query languages, SPARQL is considered by many to be the de facto industry standard.

In the context of a business, data from one or more data stores may be periodically compiled in an ontology, such as in a batch process occurring at times when there is less use of the business' computer systems, such as at night when most employees are not present. Once compiled in an ontology, an ontology reasoner can be used to make logical inferences from the ontology. Generally, an ontology reasoner or semantic reasoning module is a module implemented in hardware or software executed by a processor, configured to infer logical consequences from a set of facts or axioms stored in an ontology. This process is often referred to as "reasoning." Data from an ontology may be converted into a form convenient for processing by the reasoner, such as in a manner described in co-pending U.S. patent application Ser. No. 12/576,176, entitled "Techniques for Processing Ontologies," filed on Oct. 8, 2009, and which is incorporated herein by reference for all purposes. Ontology reasoners are also known as reasoning engines, rules engines, or simply reasoners. Examples include RETE-based rules engines such as JESS, a rules engine for the Java platform, available for download at http://www.jessrules.com, and probabilistic description logic reasoners such as Pronto, available from Clark & Parsia LLC, located at 926 N St. NW Rear, Studio #1, Washington, D.C. 20001. Ontology reasoners typically incorporate algorithms that, if possible, avoid analyzing complete data sets, and instead analyze only relevant data.

Often the rules used by reasoners to ensure compliance with one or more policies change over time. For example, as laws, computer systems, and other things applicable to a business' operations change, new types of fraud emerge. In addition, those wishing to perpetrate fraud on a business become more clever as prior ways of committing fraud become known and, therefore, more easily detected. Thus, in order to detect emerging methods of committing fraud or, generally, in order to ensure compliance with new and/or changing policies, the reasoners that analyze data must be updated accordingly. Typically, updating reasoners is a cumbersome process that involves reprogramming the rules by which the reasoners operate.

Moreover, different reasoners may use data in various ways. For instance, pattern-based reasoners analyze data using various statistical techniques in order to make inferences based on the analysis. As an example, correlations among invoice amounts, check amounts, and other data items may be found using statistical techniques in order to identify potential cases of fraud. Likewise, various statistical techniques may be used to identify suspicious transactions for follow up by an investigator. For instance, patterns for spending, transferring money, and the like may be analyzed so that activity falling outside of a pattern may be identified as potential fraud.

Other types of reasoners may use data in a completely different way. For instance, transitive reasoners may be used to infer relationships from a given set of relationships, as will be discussed in more detail below. Briefly, a transitive reasoner may infer that, because a first entity is related to a second entity, and because the second entity is related to a third entity, the first entity is related to the third entity. Typically, while various reasoners provide useful information in various contexts, combination of disparate reasoners has been difficult to achieve.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments of the present invention provide techniques for reasoning data. In one embodiment, a method of reasoning data is disclosed. The method may be performed under the control of one or more computer systems configured with executable instructions and may include storing data in a data store, reasoning the data using at least one semantic reasoning module and at least one pattern-based reasoning module in series with the semantic reasoning module to determine a conclusion, and causing information related to the conclusion to be displayed. The data store may be a semantic data store and reasoning the data may include using output of one of the semantic reasoning module and pattern-based reasoning module as input of the other of the semantic reasoning module and pattern-based reasoning module. In one embodiment, the method further comprises receiving a selection of said at least one semantic reasoning module and of the at least one pattern-based reasoning module from a user, where the selection is from a plurality of potential semantic reasoning modules and potential pattern-based reasoning modules. The method may also include receiving from a user instructions for defining a particular semantic reasoning module that incorporates said at least one semantic reasoning module and/or receiving from a user instructions for defining a particular pattern-based reasoning module that incorporates said at least one pattern-based reasoning module.

In another embodiment, a system for reasoning data is disclosed. The system includes a data store and one or more processors that are collectively operable to perform analysis on data from the data store according to a reasoner. The reasoner, in an embodiment, includes one or more semantic reasoning modules and one or more pattern-based reasoning modules in series with the one or more semantic reasoning modules. The data store may be a semantic data store and the reasoner may include at least one pattern-based reasoning module in parallel with another pattern-based reasoning module and/or at least one semantic reasoning module in parallel with another semantic reasoning module and/or at least one pattern-based reasoning module in parallel with at least one semantic reasoning module. The system, in another embodiment, comprises an operational data store from which data in the semantic data store is extracted. Further, the reasoner may be adapted to be scalable with the addition of one or more additional semantic reasoning modules or additional pattern-based reasoning modules.

In yet another embodiment a computer readable storage medium having stored thereon instructions for causing one or more processors to reason data is disclosed. The instructions include instructions that cause the one or more processors to cause storage of data in a data store, and cause the one or more processors to reason the data using a reasoner to determine a conclusion. The reasoner comprises at least one semantic reasoning module and at least one pattern-based reasoning module in series with the semantic reasoning module and the instructions cause information related to the conclusion to be displayed. In an embodiment, the data store is a semantic data store. Also, the instructions may cause the one or more processors to use output of one of the one or more semantic reasoning modules for input to the one or more pattern-based reasoning modules, and/or use output of one of the one or more pattern-based reasoning modules for input to the one or more semantic reasoning modules. The instructions may further include instructions that cause the one or more processors to receive a selection of the one or more semantic reasoning module and of the one or more pattern-based reasoning module from a user, where the selection is from a plurality of potential semantic reasoning modules and potential pattern-based reasoning modules. The computer readable storage medium may also include instructions that cause the one or more processors to receive from a user instructions for defining a particular semantic reasoning module that incorporates said at least one semantic reasoning module. In another embodiment, the computer readable storage medium includes instructions that cause the one or more processors to receive from a user instructions for defining a particular pattern-based reasoning module that incorporates said at least one pattern-based reasoning module. The reasoner may be scalable by the addition of one or more additional semantic reasoning modules and/or pattern-based reasoning modules.

For a fuller understanding of the nature and advantages of the present invention, reference should be made to the ensuing detailed description and accompanying drawings.

BRIEF DESCRIPTION OF THE DRAWINGS

FIG. 6 shows an inference library created from the map function output of FIG. 5;

FIG. 7 shows a method for processing data according to the process demonstrated in FIGS. 3-5, in accordance with an embodiment;

FIG. 8 shows a graphical representation for updating an inference library, in accordance with an embodiment.

DETAILED DESCRIPTION OF THE INVENTION

Figure 1:
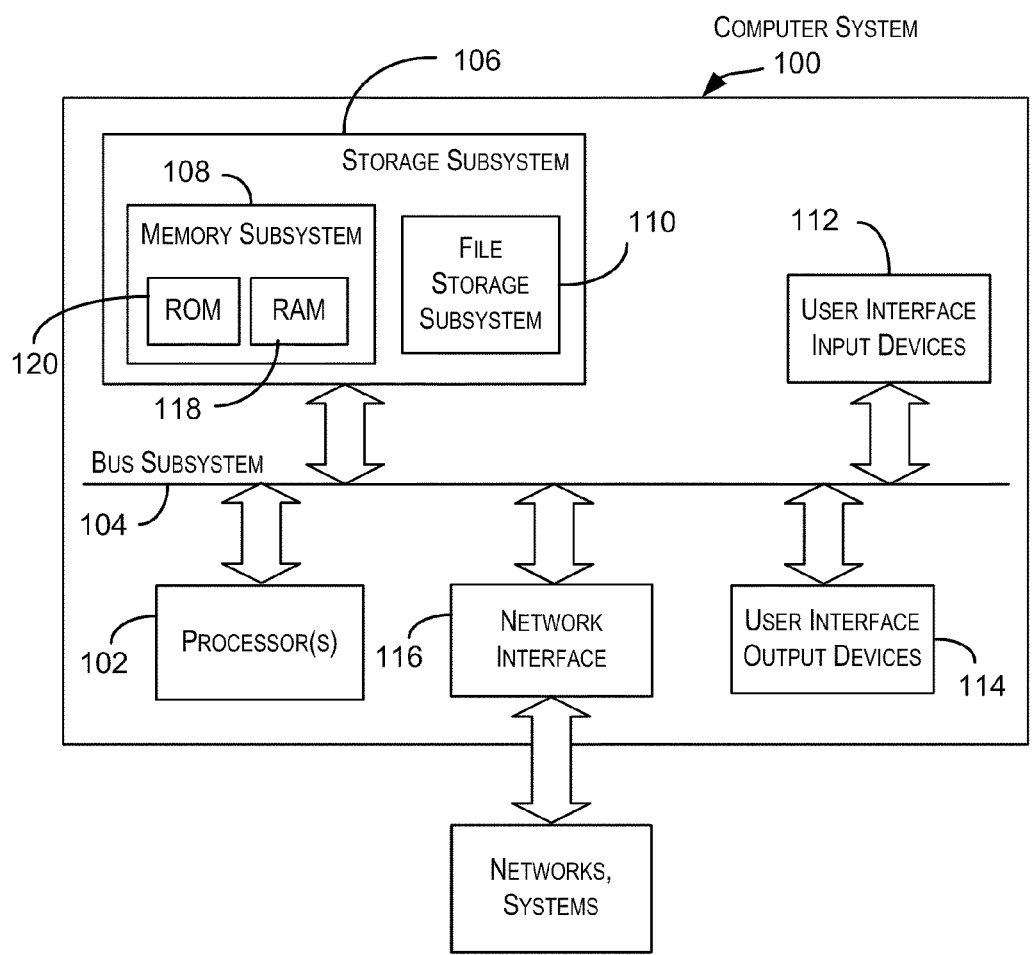
FIG. 1 shows a simplified block diagram of a computer system that may be used to practice an embodiment of the present invention.

In the following description, for the purposes of explanation, specific details are set forth in order to provide a thorough understanding of embodiments of the invention. However, it will be apparent that the invention may be practiced without these specific details.

The following description describes an embodiment of the present invention in the business policy domain, and specifically with implementing business policies using ontologies that encode business data. However, the scope of the present invention is not restricted to business policies, but may be applied to other domains or applications. For example, any domain or application where a set of rules or criteria is used to analyze data may make use of the present invention. Examples of domains in which embodiments of the present invention may be used include segregation of duties, separation of powers, transaction monitoring, fraud or other crime detection, semantic web applications, and generally applications dealing with large sets of data.

In general, embodiments of the present invention provide techniques for processing one or more ontologies, where the ontologies encode data such as business data. Processing ontologies can be used, for example, in order to implement business policies where, unless otherwise clear from context, a policy is a set of one or more conditions and a set of one or more actions to be taken when the one or more of the conditions are met. For example, a policy may specify that all transactions of a certain type (such as credit card charges) over a specified amount require approval by a person of a specified class, such as a manager. In this example, the conditions of the policy are that transactions have a specified type and amount and an action of the policy is authorization of transactions meeting the conditions by a person of a specified class. An action of a policy may also be simply identification of data that meets the policy's condition(s). For instance, a policy may specify that all transactions of a certain type and over a certain amount should be identified. In this example, the conditions are the same as in the previous example, but the action is identification of transactions meeting the conditions so that, for example, a manager may review the identified transactions and investigate any transactions he or she deems suspicious.

Typically a policy is used to implement a business policy which is one or more rules, guidelines, and/or principles related to the conduct of a business. For instance, a business policy specifying that invoices over a specific amount require manager approval may be implemented by creating a policy that includes criteria for identifying invoices over the specified dollar amount from information stored in one or more data stores.

In a specific embodiment, business data is extracted from a plurality of operational data stores of an organization and stored in one or more semantic data stores, where the one or more semantic data stores store data in a manner associating the data among one another according to semantic relationships among semantic objects represented by the data. The data in the one or more semantic data stores is then reasoned with a reasoner. The reasoner, in this embodiment, comprises a modular architecture that includes a plurality of reasoning modules. The reasoning modules may be semantic reasoning modules, pattern-based reasoning modules, and/or other types of reasoning modules, and/or composites of various types of reasoning modules. Reasoning modules with their own input and output format types may be added to the reasoner, dynamically, and in order.

Turning now to the drawings, FIG. 1 is a simplified block diagram of a computer system 100 that may be used to practice an embodiment of the present invention. Computer system 100 may serve as a user workstation or server, such as those described in connection with FIG. 2 below. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device in order to execute commands in connection with implementation of specific embodiments of the present invention, such as to select reasoning modules for and direct operation of a reasoner, as described below.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. Results of implementing policies, defining policies, and configuring various components of a computer system may be output to the user via an output device.

Storage subsystem 106 provides a computer-readable medium for storing the basic programming and data constructs that provide the functionality of the present invention. Software (programs, code modules, instructions) that when executed by a processor provide the functionality of the present invention may be stored in storage subsystem 106. These software modules or instructions may be executed by processor(s) 102. Storage subsystem 106 may also provide a repository for storing data used in accordance with the present invention, for example, the data stored in the diagnostic data repository. For example, storage subsystem 106 provides a storage medium for persisting one or more ontologies. Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 100 can be of various types including a personal computer, a portable computer, a workstation, a network computer, a mainframe, a kiosk, personal digital assistant (PDA), cellular telephone, a server, or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Figure 2:
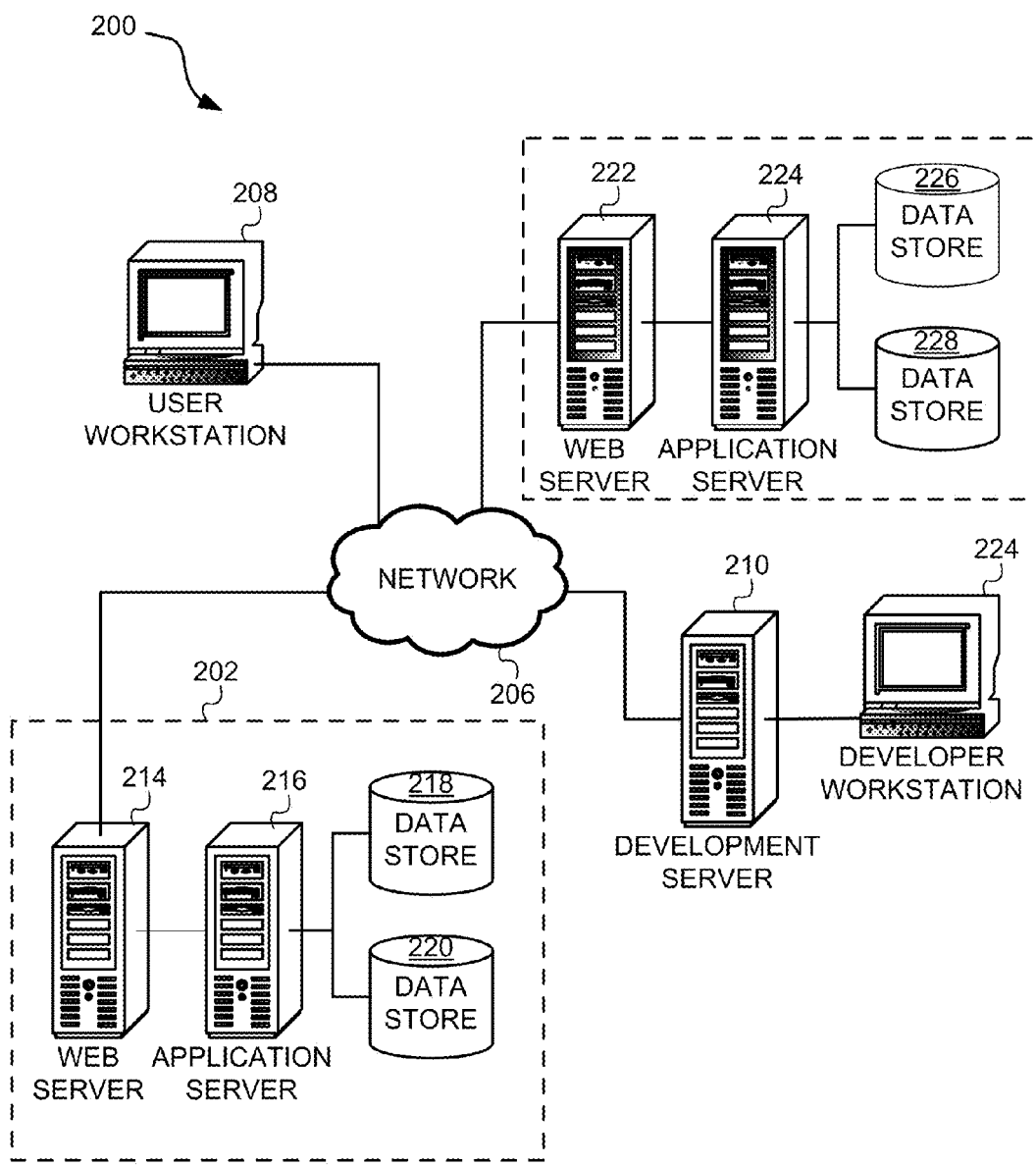
FIG. 2 shows an example of an environment in which embodiments of the present invention may be practiced.

FIG. 2 shows a simplified block diagram of an enterprise computer system 200 that may be used to practice an embodiment of the present invention. It should be understood that, generally, enterprise computer systems vary greatly and, as a result, specific embodiments may include more or less components than shown in the figure and that the specific components shown in FIG. 2 are only intended to provide an example for the purposes of illustration.

In accordance with an embodiment, the enterprise computer system 200 includes a first location 202 and a second location 204 communicatively connected by a network 206, such as the Internet or any suitable communications network or combination of networks. In an embodiment, the first location 202 and second location 204 correspond to separate physical locations of a business, such as offices in two separate cities, states, or countries. While FIG. 2 shows two locations, it should be understood that a business may have only a single location and may include more than two locations. As shown in the drawing, the enterprise computer system 200 may include one or more user workstations 208, a development server 210, and a developer workstation 212. The user workstation 208, development server 210, and/or development workstation 212 may be physically present at any of the locations, or at separate locations. In an embodiment, the user workstation 208 and development server 210 are communicatively connected to the network 206 so as to access various components of the enterprise computer system. For example, the user workstation 208 may include a browser used for viewing content provided from the Internet and/or from other systems within the business. Further, the developer workstation 212 may be connected to the network 206 through the development server 210 and may be adapted to enable certain employees within the organization to configure, install, modify, and perform other actions in connection with the business' computing systems. As an example, a developer within the organization may utilize the developer workstation in order to create policies that are used to define policies and execute one or more applications that stores data in one or more ontologies, and that reason the data according to the policies in accordance with various embodiments of the invention. Instructions for controlling the applications and the defined policies may be sent over the network 206 to an appropriate computing device executing the one or more applications.

As noted above, the first location 202 may include various computer systems used in operating the business. For example, as depicted in FIG. 2, the first location 202 includes a web server 214 configured to receive requests from various users, such as from a user of the user workstation 208, and to respond to the requests over the network 206. While FIG. 2 shows the web server as a hardware component, as with any of the servers described herein, the web server may also be a software module operating on a computer system. Responses from the web server 214 may be provided from the web server 214 itself or through the web server 214 but from a variety of sources in communication with the web server 214, such as from components of an internal computer system of the first location 202 or from other web servers located at other, possibly third-party, locations.

In an embodiment, the web server 214 is communicably coupled to an application server 216, which is a hardware component or software module configured to run one or more applications, such as one or more policy engines and other applications for managing organizational data. As is known, a user of the user workstation 208 may send a request to the web server 214 that specifies a specific action to be taken in connection with an internal business application implemented on the application server 216. The web server 214 then relays the request to the application server 216 which takes the specified action and returns the result of that action to the web server 214, which in turn relays the result to the user workstation 208. In accordance with an embodiment, the web server 214, or other component, may modify the content returned to the user workstation 208 in accordance with one or more policies applicable to a user of the user workstation 208.

As shown in the example of FIG. 2, the application server 216 interacts with data stored in a first data store 218 and a second data store 220, each of which may store data relevant to the business' operation, such as in one or more relational or other databases. While the disclosed example shows the first location 202 having two data stores, it should be understood that the first location 202 may have less than two data stores or more than two data stores. Information in the data stores can include a wide variety of data, such as data relating to business transactions, invoices, human resources data, user account data, receipts, bank account data, accounting data, payroll data, and generally, any data relevant to the operation of a particular business. Information from the data stores 218, 220, and other sources, may be extracted from the data stores, converted to a uniform format, and stored in an ontology in accordance with an embodiment.

In an embodiment, the second location includes its own web server 222, application server 224, first data store 226, and second data store 224 which may be configured to function similarly to the identically named components above.

FIG. 7 shows a flowchart demonstrating a method 700 for processing data in accordance with an embodiment. The method 700 (or any method disclosed herein), for example, can include techniques described below in connection with FIGS. 3-8. As with any method disclosed herein, the method depicted in FIG. 7, or variations thereof and/or combinations thereof, may be implemented by software (e.g., code, instructions, program) executing on a processor, by hardware, or combinations thereof. The software may be stored on a computer-readable storage medium, for example, in the form of a computer program comprising a plurality of instructions executable by one or more processors.

In an embodiment, data is stored in an ontology by creating ontology data from various business data sources at a data storage step 702. As noted below, the data can be enterprise business data or, generally, any type of data. Storage of the data can be performed in a variety of ways. For instance, in an embodiment, a batch process is periodically executed that causes data stored in data stores to be compiled into an ontology. For instance, data stored in a first form can be transformed using one or more adapters configured to convert data from a first form to a form suitable for storage in the ontology. In addition, automatic Extract, Transfer, and Load (ETL) operations from a business' data sources to a semantic data store that embodies the ontology may be defined and set to run when trigger conditions are met, such as at certain times or when a certain amount of data has been changed.

At a partitioning step 704, the ontology data is partitioned so as to be distributable among a plurality of processors. Each processor may implement the same or a different reasoner instance. Partitioning the data may include encoding the ontology data in a matrix, such as in a manner described below, and partitioning the matrix using one or more matrix partitioning techniques. In alternate embodiments, the ontology data is not necessarily encoded in a matrix, but is distributed using other methods. For instance, because ontologies can be represented as graphs, such as directed graphs, graph partitioning techniques may be used. Generally, any technique for partitioning data among a plurality of reasoners may be used.

At a distribution step 706, the partitioned ontology data is distributed among a plurality of processors, each of which may implement of instances of the same or a different reasoner. Techniques, such as those described in *Map Reduce: Simplified Data Processing on Large Clusters*, by Jeffery Dean and Janjay Ghemawat, published at the Sixth Symposium on Operating System Design and Implementation, which is incorporated by reference for all purposes, may be used to coordinate the actions of the reasoners. In this manner, the processing of the ontology data is performed by a plurality of reasoners so as to reduce the time necessary for processing. At a combination step 708, the results of the processing by the plurality of reasoners are combined into a set of processed data. Combination may include connecting results of separate processing according to relationships associating different sets of separately-processed data, such as data encoded in intersection vectors, such as those described above. Again, in an embodiment, MapReduce techniques may be used to coordinate combination the results from the reasoners.

In this manner, the work done in processing an ontology is performed efficiently and more quickly than if the ontology was processed with a single reasoner. Other benefits in using the above method are also incurred. For example, the embodiments of the disclosed method allow for efficient handling of new and/or modified data, as described in more detail below in connection with FIG. 8.

As businesses and other organizations operate, the data they store changes as a result of business operations. New invoices are created, new payments are made to vendors, employee roles change, new people or organizations become customers, peoples' position within an organization changes, and other events happen during the course of operating a business that may influence the addition, subtraction, or modification of associated data. Moreover, because the amount of data stored by a business is typically very large, creation or modification of an ontology based on the data typically takes a large amount of resources and, therefore, is performed as a batch process, often during times when a business' systems are under a lighter work load, such as at a time of the day when many employees may be at home or when most potential customers are asleep.

Figure 3:
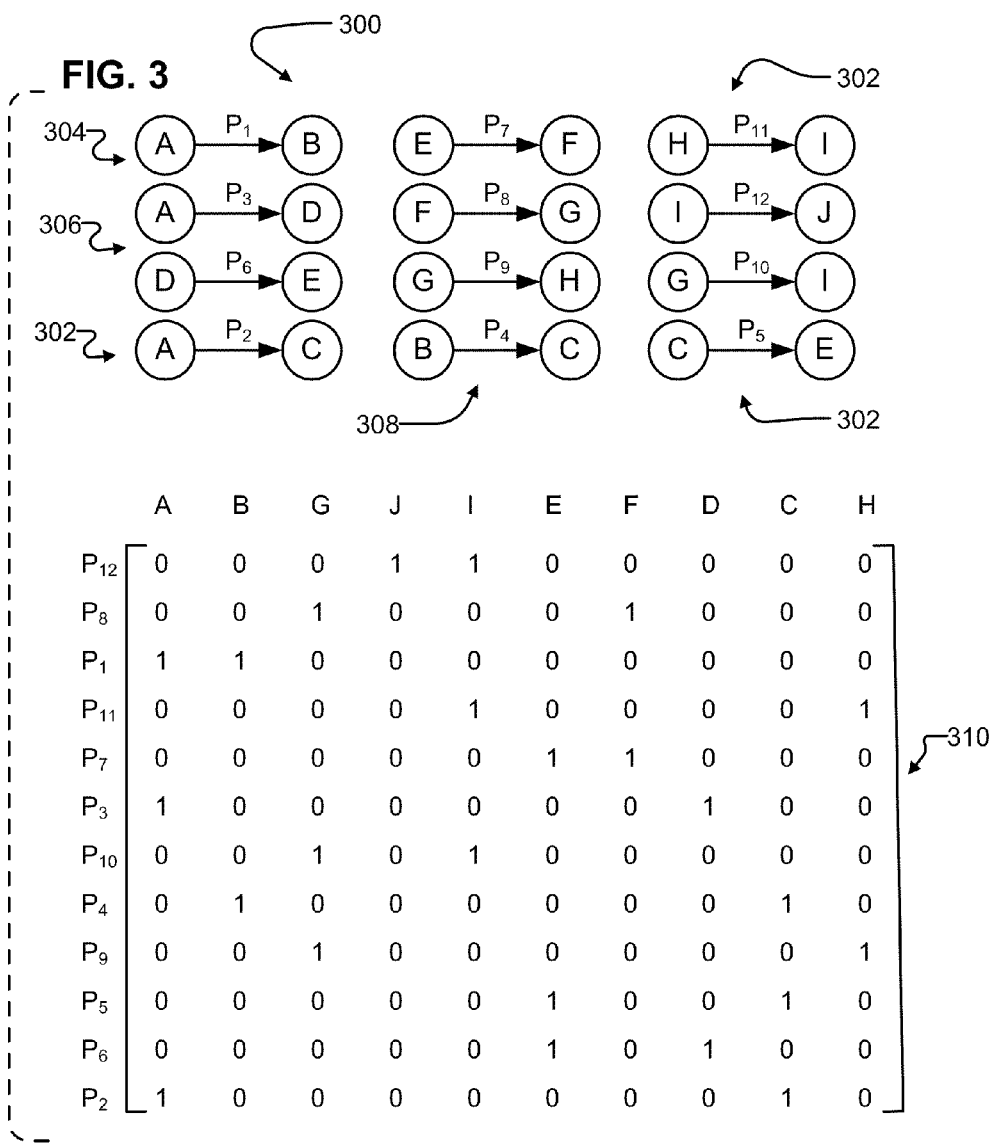
FIG. 3 shows a data set of an ontology and a matrix encoding the data set, in accordance with an embodiment.

FIG. 3 shows a representation of an example data set 300 stored in an ontology, in accordance with an embodiment. It should be understood that the data set 300 is given for purposes of illustration and typically data sets for businesses or other organizations will be larger and more complex. In an embodiment, the data set 300 comprises a plurality of triples 302 where a triple includes a first node, a second node, and a relationship between the first and second nodes. For example, a first triple 304 includes a first node A, a second node B, and a relationship $P_1$ between A and B. Each node in a triple may represent a data point, such as a piece of information stored in a database of a business or used in connection with operation of such a database. Each node can be a simple piece of information such as an employee name, a particular line item, a particular invoice, a class of employees, or generally any type of information or class of information that can be stored. Each node can also represent more complicated sets of information such as complete data records or files or classes of information including attributes of the class.

As a concrete example, A may represent John Doe and B may represent a specific class of employee, such as a manager. In the relationship shown in the example of the first triple 304, $P_1$ connecting A to B indicates that John Doe is a manager. As shown in the example in FIG. 3, relationships between nodes may be directional, as indicated in the example by an arrow. For example, continuing with the example of the first triple 304, the arrow extending from A to B indicates that John Doe is a manager but not necessarily that all managers are John Doe. A node may relate to more than one other nodes. For example, FIG. 3 shows a second triple 306, showing a relationship $P_3$ between the node A and a node D. Thus, considering both the first triple 304 and the second triple 306, it can be seen that the node A relates to both B and to D by two different relationships. Specifically, A is related to B by $P_1$ and related to D by $P_3$. For example, D may indicate a class of employees having access to a particular system, such as a security system, accounting computer system, and the like. Thus, read together, the first triple 304 and second triple 306 indicate that John Doe is a manager, and John Doe also has access to the system represented by D. In addition, various nodes can be related to each other through inferred relationships. Briefly, for example, FIG. 3 shows a third triple 308 showing a relationship $P_4$ between nodes B and C. Continuing the example discussed above, C may be a specific set of accounting data for an organization. Thus, the relationship represented by the third triple indicates that all managers have access to the accounting data. Thus, when reading the first triple 304 and the third triple 308 together, a relationship between A and C may be inferred that John Doe has access to accounting data because John Doe is a manager. Further details on inferred relationships are provided below.

In an embodiment, the data set 300 may be represented in a matrix. For example, FIG. 3 shows a matrix 310 in accordance with an embodiment. The matrix 310, in the example shown, is formed by a series of row vectors, each row vector corresponding to a relationship of the data set 300. As shown in the example, the order of the row vectors of the matrix 310 does not have any particular significance; however, specific orderings, such as an ordering proceeding according to an index of possible relationships, and other orderings may be used.

Each column vector in the matrix 310 represents a node and, as with the row vectors, the columns need not be in any particular order, but may be. Matrix 310 comprises an entry at each intersection of a row vector and a column vector. The entries in the matrix 310 store values that encode data set 300. In an embodiment that values for the entries in matrix 310 are either zeros or ones. Although the example given shows entries having values of 0 or 1, other values, such as Boolean values of "true" and "false," or generally any set of distinguishable values may also be used in alternative embodiments.

As noted, the columns and rows of the matrix 310 may or may not be in any particular order. For instance, in an embodiment, data is extracted from one or more data stores and used to construct the matrix and the manner or order in which the matrix is constructed or extracted may dictate the matrix's initial form. For instance, in an embodiment, rows may be added to the matrix sequentially as relationships between extracted data are determined. In another embodiment, columns may be appended to the matrix as each data point is examined to determine the relationships associated with the data point.

In an embodiment, a particular row includes entries of zero or one. The relationship associated with the row may be determined by the one entries. Specifically, a column of the matrix that intersects the row at a one entry is associated with a node involved in the relationship. Likewise, a column of the matrix that intersects the row at a zero entry is associated with a node that is not involved in the relationship. Thus, counting from the top, looking at the first row of the matrix 310 which corresponds to the relationship $P_{12}$, the intersection between the A column and the $P_{12}$ row includes a zero entry thereby indicating that relationship $P_{12}$ does not involve the node A. The intersections of the $P_{12}$ row with columns J and I includes entries of one, indicating that the relationship $P_{12}$ involves I and J. In a like manner, ones or zeroes are filled in matrix 310 to represent the relationships represented by data set 300.

It should be understood that, while FIG. 3 shows a matrix representation of the data set 300, other representations can be used. For example, matrices may be constructed differently than shown in the figures. For instance, in an alternative embodiment, row vectors may correspond to nodes while column vectors may correspond to relationships. As another example, as is known, data sets stored in ontologies may be represented in a graph, a directed graph, or another representation which may encode data differently. Techniques analogous to the techniques described below, such as techniques for graph partitioning, may also be used in accordance with the present invention. Further, it should be understood that while the examples in the figures show graphical representations of specific matrices, including the entries of the matrices, matrices corresponding to data sets will typically be too large to be displayed in the same manner, but may be stored in computer memory (either volatile or non-volatile) in a manner dictated by a specific application used to create the matrices or other representations of the data.

In an embodiment, the matrix 310 is partitioned into a convenient form, for example, by using known techniques of linear algebra. For instance, the matrix 310 may be placed into block form by using elementary row operations such as swapping rows. Column operations, such as switching columns, may also be used. When row, column, or other operations are used, an index vector, list, or other mechanism that may be part of the matrix or stored in another location, may be updated to keep track of which relationships and/or nodes correspond to each vector. For example, each entry of the first row may include information (such as a string or number) identifying a particular relationship and the first entry of each column may include information identifying a particular node. In this manner, when a row or column operation is performed, the identifying information of the associated rows and/or columns are affected by the operation in a way that keeps track of the rows and/or columns. As a concrete example, if the first and second rows are switched, in an embodiment, the information identifying the first row moves to the second row and the information identifying the second row moves to the first row.

In an embodiment, partitioning a matrix includes arranging the columns such that the matrix encodes the directions of the relationships of the represented triples. Thus, the columns may be arranged such that the column corresponding to the first node in a triple is to the left of the column corresponding to the second node in the triple. Other configurations of matrices that encode the direction of the relationships may also be used, such as the inclusion of an additional encoding column that includes entries that correspond to the direction of triples included in a particular row. For instance, an additional column may be added to the matrix 310 so that the intersection of a row with the additional column includes a 0 if the order of the columns corresponds to the direction of the relationship encoded in the row and a 1 otherwise. For instance, the first row has a 1 in the intersections with the I and J columns, but the J column appears before the I column, so the order to the I and J columns does not correspond to the relationship $P_{12}$ extending between the I and J nodes. Therefore, in this example, an encoding column would have a 1 in the intersection of the first row with the encoding column to indicate that the relationship $P_{12}$ extends from I to J.

In an embodiment, with the columns arranged, the rows are arranged so that the matrix is in block form. Matrices used in accordance with the present invention will generally be sparse matrices because each row, in an embodiment, will have only two non-zero entries corresponding to the specific data represented in the row. As a result, such partitioning may be performed to form a matrix having more than one block which is convenient for visualizing and processing of the data set 300, as described more fully below.

Generally, when a matrix is used to encode data, the matrix can be partitioned into a convenient form, such as block form, using various techniques. For example, spectral partitioning can be used to partition incidence, Laplacian, or other matrices that encode a graph representative of ontological data. Likewise, multilevel coarsening and partitioning techniques, such as those that coarsen, partition, and then uncoarsen a matrix may be used. Of course, hybrid approaches of the above techniques and/or other techniques can be used as well.

It should be noted that such rearrangement of the columns may not be straight forward if a data set includes a circuit, which is a set of one or more nodes and one or more relationships arranged such that an inferred or direct relationship exists between a node and itself. For example, a circuit exists in a situation where A relates to B, B relates to C, and C relates to A, with the directions of the relationships extending from A to B, from B to C, and from C to A. With a circuit, it is not straight forward to order the columns in order to encode the directions of the relationships without taking additional measures. For instance, in the circuit described above, the C column would have to occur simultaneously before and after the A column. Nevertheless, one with ordinary skill in the art would recognize that such situations may be remedied through a variety of techniques. For example, a data set may be pre-processed to locate any circuits. If any circuits are found, triples may be removed from the data set to break any circuitous paths. For instance, the triple of C to A may be removed in the example given above so that A does not indirectly refer to itself. The removed triples may be separately processed and the results of the separate processing may be combined with results of processing the modified data set.

Figure 4:
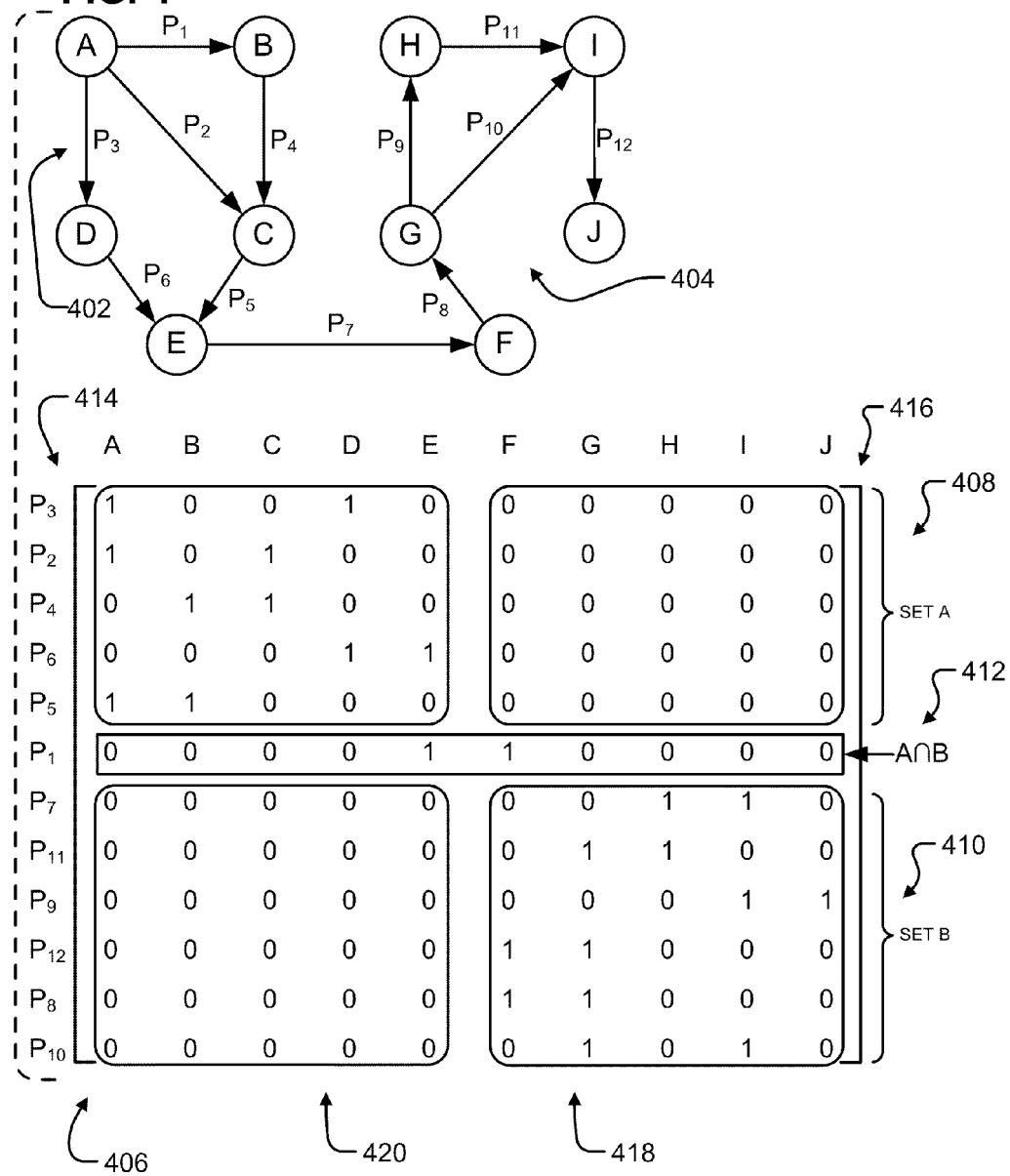
FIG. 4 shows the data set and the matrix of FIG. 3 in partitioned form.

Because the data set 300 is stored in an ontology, it can be considered as a graph, having vertices being the nodes and the relationships being edges. In an embodiment, partitioning a matrix representative of a data set can be visualized by equivalent operations on a graph representing the data set. For instance, FIG. 4 shows a representation of a graph 400 of a data set such as the data set 300, above, which shows the transitive properties of the data set. For example, if A is related to B and B is related to C, then the graph shows edges connecting B to both A and C. As shown in the example, the graph 400 includes a first subgraph 402 and a second subgraph 404. The first subgraph 402 and the second subgraph 404 are related to each other through the relationship $P_7$ connecting node E, which is in the first subgraph 402, to node F, which is in the second subgraph 404. In this manner, processing the data set 300 can be performed by separately processing data in the subgraphs and combining the results. For example, the data in the first subgraph 402 may be processed in a first processor executing instructions for a first reasoner instance, the data in the second subgraph 404 may be processed in a second processor executing instructions for another reasoner instance, which may employ the same or a different set of rules for processing than the first reasoner instance. Either the first or second (or another) processer may be used to combine the results according to the relationship $P_7$.

It should be understood that data sets will vary and, as a result, decomposition of a graph representing a data set will vary accordingly. For instance, a graph may be partitioned into subgraphs that are disconnected, or may be partitioned into subgraphs that are connected to one another by more than one edge. In addition, a typical data set, in accordance with an embodiment, will be partitioned into more than two subgraphs which may be processed separately. Further, data in some subgraphs may be processed in one processor, while data in other subgraphs may be processed in another processer or processors.

Turning to the matrix representation, FIG. 4 also shows a matrix 412 which has been partitioned into a convenient form. For example, the matrix 412 in an embodiment is a matrix resulting from the transformation of the matrix 310, described above. As described above, the columns of the unpartitioned matrix 310 have been rearranged such that they encode the direction of the relationships between the nodes. In an embodiment, if a relationship extends from a first node to a second node, then the column associated with the first node is placed before the column associated with the second node. For example, because the relationship $P_1$ extends between A and B, the A column is placed before the B column.

Further, the rows of the matrix 412 have been arranged so as to put the matrix in block form which, as described below, results in partitioning the data into separately processable partitions. As discussed above, many different techniques for partitioning matrices into block form may be used in accordance with various embodiments. As shown, the matrix 412 includes a first vector set 408 (SET A) comprising the upper seven rows of vectors and a second vector set 410 (SET B) comprising the lower six rows of vectors, where the first vector set 408 is above the second vector set 410. An intersection vector set 412 comprises the row vectors that are common to both the first vector set 408 and second vector set 410. As discussed, the matrix and sub matrices of FIG. 4 are provided for the purposes of illustration and, generally, matrices used in accordance with various embodiments may have vector sets and sub matrices having different characteristics, such as more or less rows.

As shown in the example, the first vector set 408 includes a first submatrix 414 in the upper left corner that comprises entries that are either zero or one and a first zero matrix 416 in the upper left corner that comprises entries that are all zero. In an embodiment, the first submatrix 414 is situated to the left of the first zero matrix 416. Likewise, the second vector set 410 includes a second submatrix 418 and a second zero matrix 420 where the second submatrix 418 sits to the right of the second zero matrix 420 and the second submatrix 418 includes entries being zero or one and the second zero matrix 420 having entries all zero. In this manner, it can be seen that the partitioned matrix 406 is partitioned into discreet blocks and may include a vector connecting the blocks. While the partitioned matrix 406 is composed of four block matrices and the intersection vector 412, it should be understood that data sets, in general, in accordance with an embodiment, will be partitioned into a larger or smaller number of blocks which may or may not be separated by non-zero intersection row vectors. In addition, it should be understood that the particular positioning of the blocks of the matrix 406 is made according to mathematical convention with the blocks located along a main diagonal of the matrix 406, but that other configurations are possible.

Returning to the example in the drawing, the first submatrix 414 encodes the first subgraph 402 while the second submatrix 418 encodes the second subgraph 404 in the manner described above. The intersection vector encodes the relationship between the first subgraph 402 and the second subgraph 404. If a graph of a data set includes two disconnected subgraphs, a partitioned matrix representation may not include any intersection vectors between blocks representing the disconnected subgraphs. In addition, one or more row vectors of all zero entries may be situated between blocks representing disconnected subgraphs.

In an embodiment, a map function and a reduce function are employed in order to distribute the reasoning of an ontology among various processors and to combine the results of the distributed reasoning. Reasoning an ontology may include application of a predefined set of rules to the data of the ontology. As an example, a commonly used rule in reasoning ontologies is the transitive rule where, if node A relates to node B and node B relates to node C, then node A relates to node C. Other rules, depending on specific applications, may be used in addition to or in place of the transitive rule. In an embodiment, the map function takes as input data corresponding to a subgraph of a graph representing an ontology and a set of rules to be used by a reasoner to process the individual triples represented in the subgraph. For a subgraph and set of rules input to the map function, the output of the map function includes data corresponding to a subgraph (typically a different subgraph) and an inferred vector which may encode information about one or more triples. In an embodiment, the subgraphs output by the map function may include nodes that are common to more than one subgraph so as to encode any relationships between subgraphs.

Figure 5:
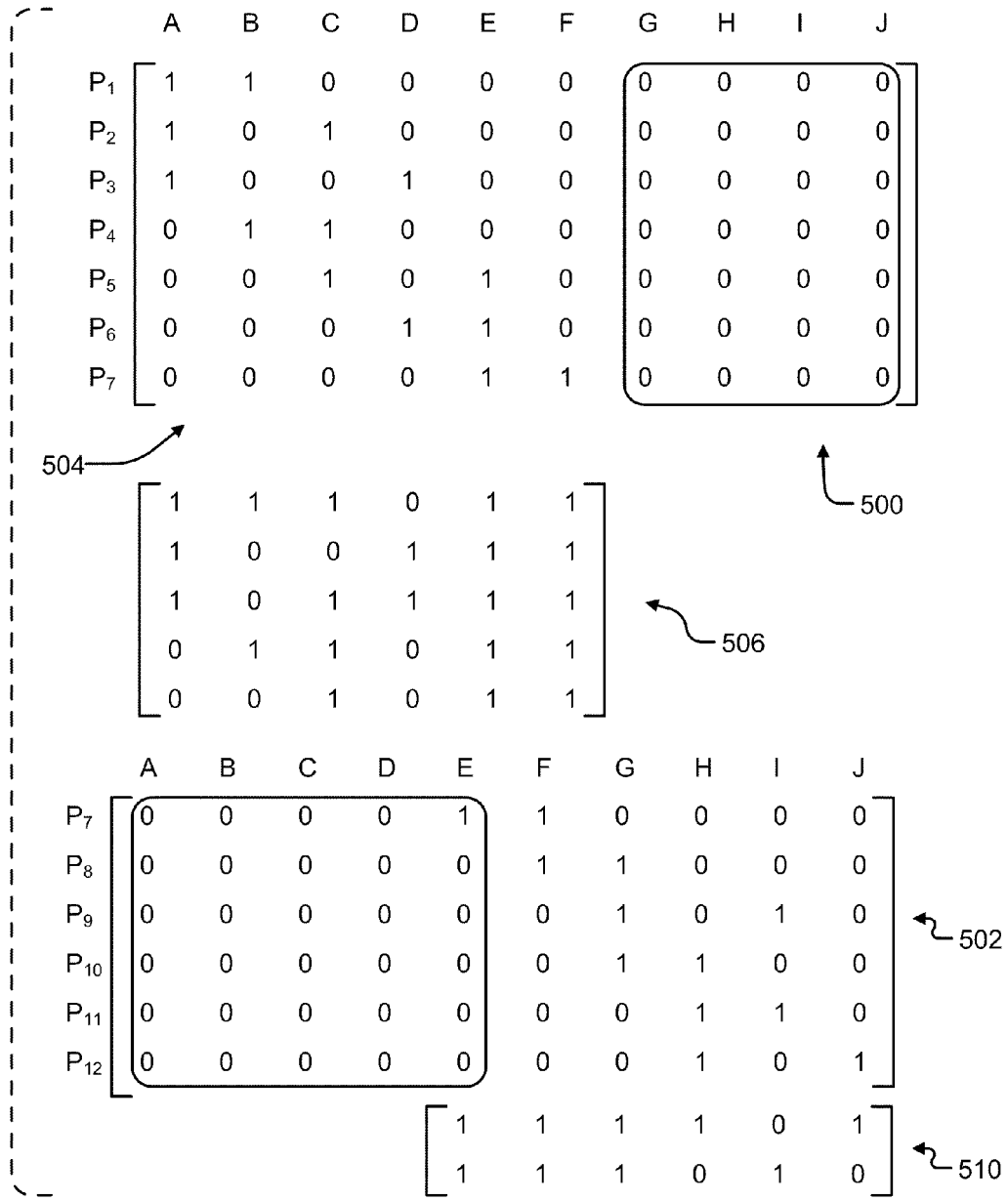
FIG. 5 shows results of a map function derived from the matrix of FIG. 4, in accordance with an embodiment.

FIG. 5 shows a specific example of matrices resulting from a map function that can be used in accordance with an embodiment. Specifically, FIG. 5 shows a first vector set 500 and a second vector set 502 in accordance with an embodiment. In an embodiment, the first vector set 500 encodes the first vector set 408 and intersection vector 412 described above in connection with FIG. 4. Referring back to FIG. 4, the first vector set 500 encodes the first subgraph 402 and the triple including nodes E and F, and the relationship $P_7$ extending between E and F. In this manner, the first vector set 500 encodes the first subgraph 402 and the triple connecting the first subgraph 402 to the second subgraph 404. In an embodiment, the first vector set 500 encodes the first subgraph 402 and triple including E, F, and $P_7$ in a manner similar to that described in connection with FIGS. 3 and 4.

Similarly, the second vector set 502 encodes the second vector set 410 and the intersection vector 412 described above in connection with FIG. 4, thereby encoding the second subgraph and the triple represented by E, F, and $P_7$. As shown in FIG. 5, in an embodiment, the row vectors of the first set of vectors 500 are simply the row vectors of the first data set 408 and intersection vector 412. In this manner, the map function outputs the first vector set 500 and second vector set 502. Subgraphs corresponding to the first vector set 500 and second vector set 502 may be ascertained from the entries in the vector sets, as described above. In an embodiment, the first vector set 500 forms a first matrix 504 which may be in block form and whose columns and rows represent nodes and relationships, respectively, as described above.

As noted above, the map function also outputs inferred vectors which may encode the relationship between two or more nodes as determined by a reasoner. For example, a set of rules may include a transitive rule for an ontology which provides, for example, that if A is related to B and B is related to C then A is related to C. The set of rules may also include information identifying which rows should be considered when implementing the transitive rule. The transitive rule in processing of ontologies is convenient because when matrix representations are used, as described above, processing the transitive rule on a subgraph can be performed using an OR operation of the relevant rows which is computationally efficient. In an embodiment, an OR operation on a plurality of rows is performed by performing an OR operation on corresponding entries in the rows. For example, if the third entry of one row is a zero and the third entry of another row is zero, an OR operation performed on the two rows will have a zero in the third entry. If the third entry of both rows is a one, then an OR operation performed on the two rows will have a zero in the third entry. If one of the rows has a one in the third entry and the other row has a zero in the third entry, then the result of an OR operation performed on the two rows will have a one in the third entry.

In an embodiment, the inferred vectors form a set of inferred vectors whose columns and rows encode triples as described above. For example, a first inferred vector set 506 results from processing the first vector set 500 according to a plurality of user-selected or predefined rules of a reasoner. Likewise, a second inferred vector set 510 results from processing the second vector set 502. In the example shown, the first row of the first inferred vector set 506 is a result of performing an OR operation on the rows $P_1$, $P_4$, $P_6$ and $P_7$ of the first submatrix 504. This particular operation, for instance, may be chosen by a user of the reasoner and any suitable operation or operations may be used. Likewise, the remaining rows of the inferred vector set 506 are formed using various OR operations on various rows of the first submatrix 504 depending on the particular rules chosen by the user. Generally, the type of operations used to make inferred vector sets will vary depending on specific applications and reasoners and it should be understood that the particular operations used to form the inferred vector sets are chosen merely as an example.

In an embodiment, a reduce function is constructed or provided whose input includes information about subgraphs and inferred triples from each subgraph. For example, the input of the reduce function may include a list of nodes directly related to nodes of the subgraph. Thus, the input of the reduce function may include all the nodes of the subgraph as well as one or more nodes of another subgraph related to the input subgraph by a relationship. For example, in reference to the first subgraph 402 and second subgraph 404 shown in FIG. 4, the input of the reduce function may include the list {{A, B, C, D, E, F}, {F, G, H, I, J}}. In this example, the nodes A, B, C, D, E, and F are from the first subgraph 402 and the nodes F, G, H, I, and J are from the second subgraph 404. The node F is included in both lists because it is the node in the second subgraph 404 to which the first subgraph 402 refers through the relationship $P_7$. The input of the reduce function may also include a list of inferred triples within the subgraphs, such as a triple including nodes A and E.

The reduce function determines, based upon the input, whether additional reasoning should take place. For instance, referring to the same example, because the first subgraph 402 and second subgraph 404 are related to each other by the relationship $P_7$, the reduce function then takes the inferred triples from each subgraph and applies the rules of the reasoner to the inferred triples input to the function and returns a list of inferences. For complicated data sets, the reduce function may be applied repeatedly or recursively to ensure that desirable inferences are identified. Thus, for example, the output of the reduce function may include an inferred triple that includes the nodes A (from the first subgraph 402) and J (from the second subgraph 404), because A and J are indirectly related to one another through a series of relationships.

FIG. 6 shows an example of the output of a reduce function using the input from the example shown in FIG. 5. In particular, FIG. 6 shows a matrix 600 (inference library) whose columns correspond to nodes and whose rows correspond to inferred triples. The inferred triples may be, for example, a result of applying a reasoner to the first inferred vector set 506 and second inferred vector set 510 of FIG. 5. As a specific example, the first row of the matrix 600 shows an inference from A to J because there is a 1 in the intersection of the A and J columns with the first row. The first row also shows the nodes involved in an inference from A to J. For instance, the intersection of the B, C, E, F, G, I columns with the first row includes a 1 while the intersection of the D and H columns includes a 0. As a result, the matrix 600 encodes information indicating that an inference from A to J may include a path extending through nodes B, C, E, F, G, and I. Likewise, the fourth row of matrix 600 encodes another inference from A to J that may include a path extending through nodes C, D, E, F, G, and I.

FIG. 8 demonstrates how embodiments of the disclosed invention allow for efficient handling of new, deleted, and/or modified data. In an embodiment, an ontology 802 representing a data set is partitioned into a plurality of subontologies, represented in the figure by $SO_1$ through $SO_n$. When a piece of data of the data set is modified, one or more triples of an ontology representing the data set change when the ontology is updated. For instance, FIG. 8 shows a vector 804 representative of a triple changed because of a change in a corresponding data point. Because of the partitioning of the ontology in accordance with embodiments of the present invention, it is possible to map the changed vector to only those subontologies affected by the change. For example, the changed vector may be mapped to a single subontology, a subset of the subontologies, or all subontologies. Because the vector is mapped to only the affected subontology or subontologies, updating the ontology may involve only updating the affected ontologies. An inference library 806, such as the inference library represented by the matrix 600. described above in connection with FIG. 6, may be updated, for example by using MapReduce techniques, by updating only the portions of the reference library affected by a change in affected ontologies instead of updating the complete reference library. Further, when multiple vectors representing triples change, the vectors can be likewise mapped to affected subontologies and updating the entire ontology can then be spread over a plurality of processors. Thus, the amount of resources spent updating an ontology based on changed data may be significantly reduced.

Figure 9:
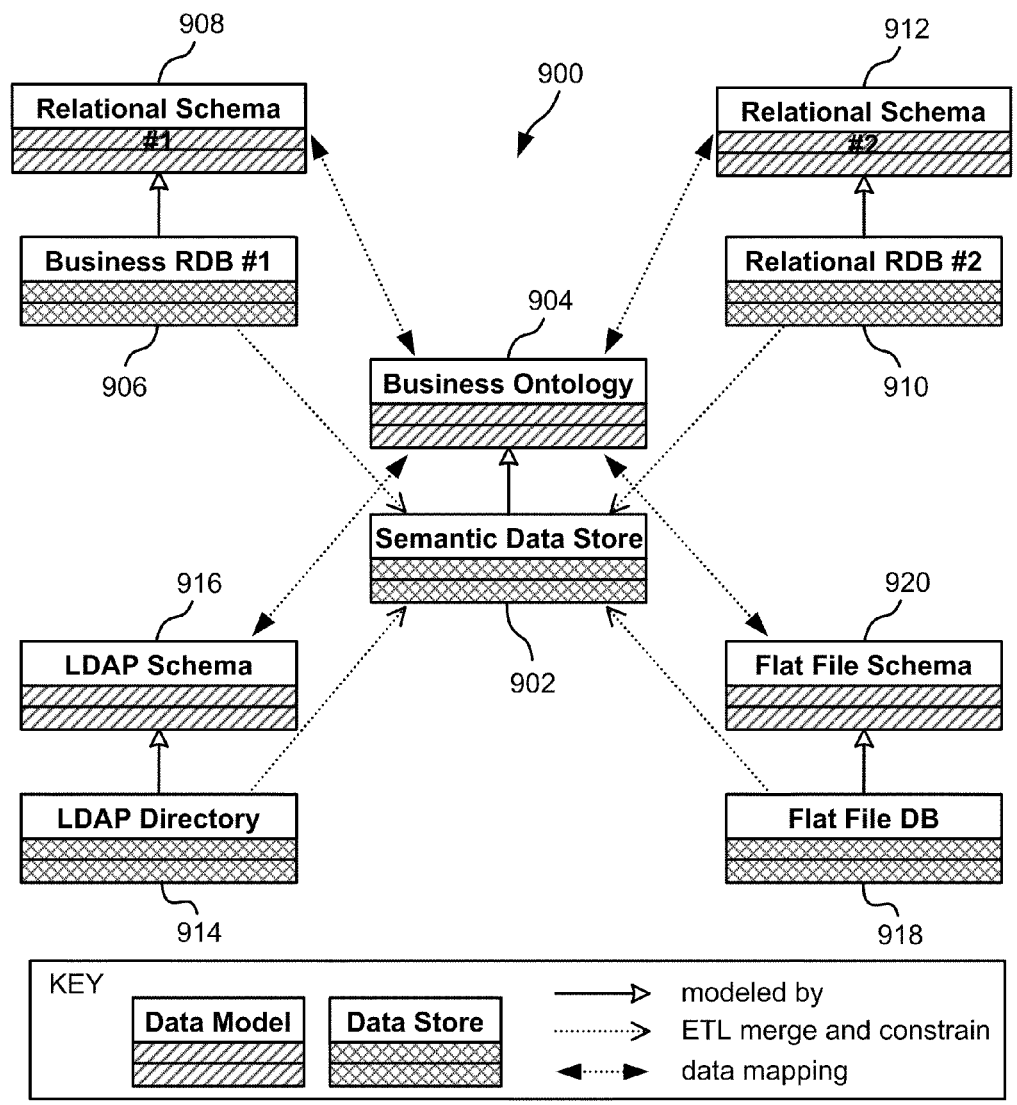
FIG. 9 shows a diagrammatic representation of a logical architecture of a semantic data store, in accordance with an embodiment.

FIG. 9 shows a general representation of an architecture for extracting semantic data from various sources in accordance with an embodiment. The architecture 900, in an embodiment, includes a semantic data store 902 which is modeled by a business ontology 904 according to declarative data mappings, as described in more detail below. Generally, in an embodiment, the business ontology 904 is a representation of semantic concepts from the semantic data store 902 and the relationships between those concepts. Also, in an embodiment, the semantic data store 902 may be realized using the W3C OWL-DL ontology language. It should be understood that, while the present disclosure refers to various concepts within a business domain, the present invention is applicable to any domain that is associated with one or more organizations that store data as part of their operations. Therefore, while the following description refers to a business, the present invention may be applicable to any organization.

In the example of FIG. 9, four different data sources of a business are shown, although a business or other entity may use more than four data sources or less than four. Also, the four different data sources may be physically realized in separate data stores, which may be in separate geographical locations, or two or more data sources may be incorporated into a single data store. As shown in the example demonstrated in FIG. 9, a business may include a first relational database 906 which is modeled by a first relational schema 908. As it applies to data storage, a schema is a structure configured to organize the data of one or more data sources. For example, in a relational database, a schema that models the relational database defines the tables of the database, the fields of each table, and the relationships between the fields and tables.

In the provided example, the business may also include a second relational database 910 which is modeled by a second relational schema 912. There can be various reasons for having more than one source of business data, for example for storing data for different aspects of a businesses' activities, such as sales and human resources. Businesses may also store data in different forms depending on the particular application. For example, in FIG. 9 a light weight directory access protocol (LDAP) directory 914 is modeled by a LDAP schema 916. Likewise, a flat file database 918 may be modeled by a flat file schema 920. Thus, in the example shown in FIG. 9, a business may include data from a variety of sources in a variety of formats.

As can be seen in the figure, data from each of the data sources is mapped to the semantic data store 902. In an embodiment, mapping data from a data source to the semantic data store 902 is described in more detail below, but generally includes extracting data from the source and loading it (or a portion of it) into the semantic data store, which may or may not involve reformatting data from one form to a form suitable for the semantic data store 902. In addition, mapping data from a data source to the semantic data store 902 may involve mapping all data from the data source or using a filter to only map some data from the data source. For instance, the data source may include data that is not pertinent to the purposes for which the business ontology 904 is used and, as a result, only pertinent data would be mapped to the semantic data store. A filter may be used to control which data is mapped to the semantic data store. For example, the data mappings above can be used in connection with Oracle Data Integration (ODI) Tools available from Oracle International Corporation in order to perform ETL processes that constrain and filter data from the various data stores and merge the data into a common format in the semantic data store 902. As described below, once maps are constructed, the maps can be used in automated processes that extract data from one data store and appropriately load the data into the semantic data store 902. Extraction and loading of data can occur, for example, at predetermined intervals such as once a day, or at predetermined triggers, such as when data is changed.

As shown in the example, data from the first relational database 906 is stored in the semantic data store 902 as well as data from the second relational database 910, the LDAP Directory 914, and the flat file database 918. In an embodiment, schemas of various data stores are mapped to the business ontology such that semantic concepts embodied in the data stores are stored in the business ontology 904. For example, the first relational database 906 may include a plurality of tables, each table having one or more columns The first relational schema 908 may relate tables together in a useful manner, for example, relating customers to invoices such that a customer is related to an invoice for goods or services purchased by the customer. Thus, relationships defined by the relational schema 908 are mapped to the business ontology 904 such that semantic concepts defined by the relational schema 908 are preserved in the business ontology 904.

Figure 10:
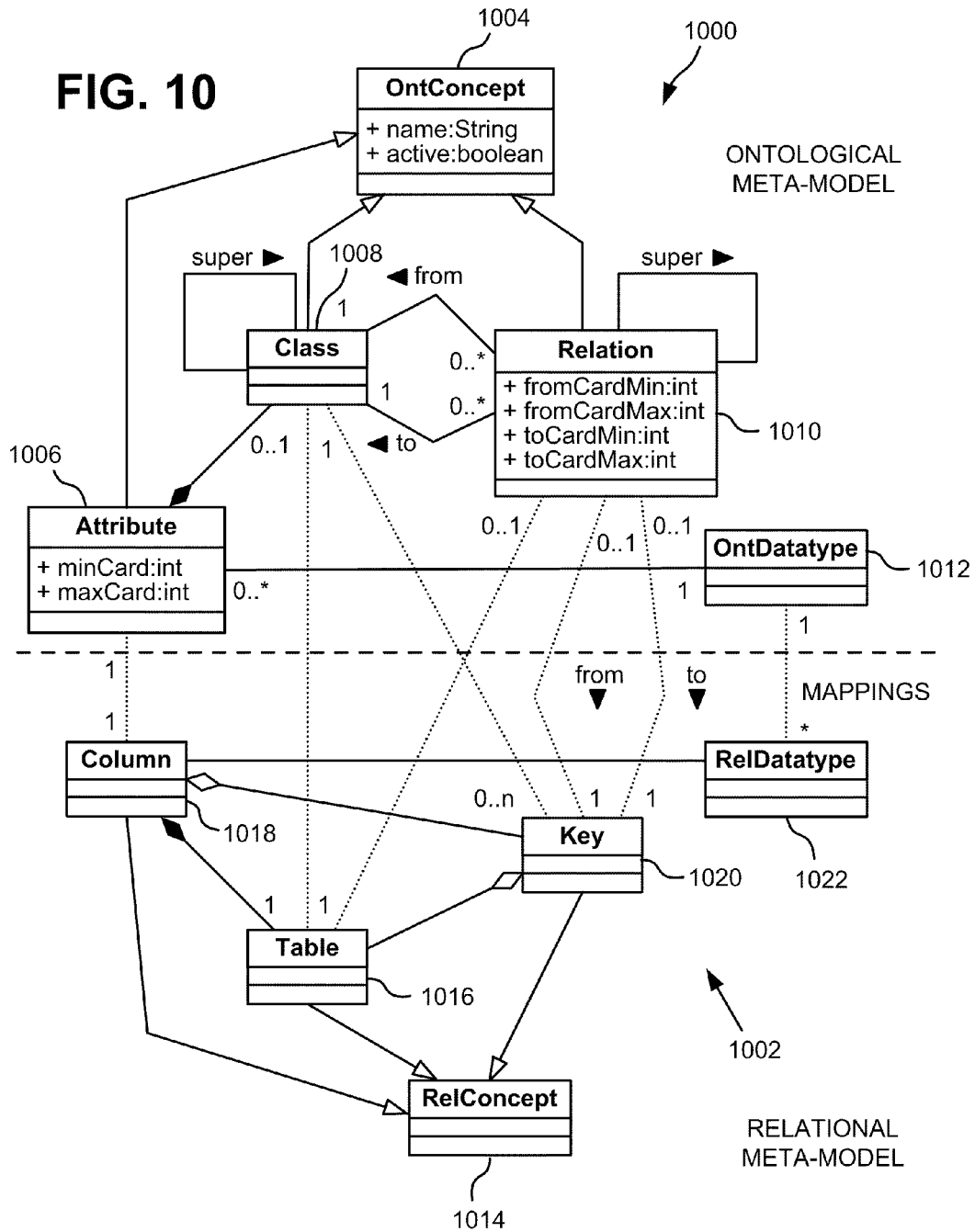
FIG. 10 shows a diagrammatic representation of mappings between ontological and relational meta-models that may be used with the architecture of FIG. 10, in accordance with an embodiment.

FIG. 10 shows an ontological meta-model 1000 which, in an embodiment, provides an implementation for the architecture described in connection with FIG. 9 and to which a relational meta-model 1002 is mapped. The example given in FIG. 10 may be useful, for example, for mapping data from a relational database to the ontological meta-model 1000 although it will be understood by those with ordinary skill in the art that various data stores and corresponding data schemas may have different properties than what is shown. In an embodiment, the ontological meta-model 1000 comprises a plurality of ontological storage containers which includes a container for ontological concepts 1004, which is a super class of attributes 1006 class, classes 1008 class, and relations 1010 class. In other words, attributes 1006, classes 1008, and relations 1010 are all types of ontological concepts. In an embodiment, each class 1008 is a collection of one or more entities or instances, such as employees, and each attribute 1006 is a collection of one or more data-type property of a class, such as a first name. As noted above, the classes can have super classes. For example a member of an Employee class may be a member of a Manager class as well.

Also, in an embodiment, each relation 1010 is a binary relationship between two classes. For example, a relation orgHasEmployees may be a relationship between a member of an organization class and an employee class. This relationship, for example, may specify employees that are part of an organization. Relations 1010 may be further classified in terms of their domains (the class or classes from which they relate) and ranges (the class or classes to which they relate). Also, in an embodiment, some relations 1010 have super relations. For instance orgHasEmployees may be a super relation of an orgHasManagers relation because, for example, all managers may be employees.

As shown in the diagram, the ontological meta model 1000 also includes storage for ontological data types 1012, which may be, for example, strings, integers, floats, dates, Boolean, or other types of data. In an embodiment, datatypes are the ranges (value sets) of the attributes and consist of sets of similar data forms. In the embodiment presented in the drawings, ontological type data is stored separately from instance data, which is stored in a hyper-denormalized relationed form. As used herein, semantic data that is in hyper-denormalized relationed form is stored such that every attribute is stored in its own table. This form provides an advantage in that instance data is easily and quickly accessible, which in turn allows for a highly distributed approach to solve problems of inferencing, persistence, and other issues. In other words, the architecture in the disclosed embodiment provides the power and flexibility of ontological storage with the performance of modern relational database management system. However, one with skill in the art will appreciate that variations are possible and that, in other contexts, different architecture may be appropriate. For example, one with skill in the art would recognize that type and instance data may be stored in the same storage system and that instance data need not be hyper-denormalized, but that different degrees of denormalization of data may be used, and different kinds of instance data may be combined in one or more containers.

As shown in the drawing, in an embodiment, between the classes are relations 1010 between the classes 1008 and there may be relations 1010 among the relations 1010. Also, each class 1008 is an aggregation of attributes, in accordance with an embodiment.

As noted above, the relational meta-model 1002 is mapped to the ontological meta-model, as described more fully below. In an embodiment, of relational meta-model includes relational concepts 1014 which are super classes of tables 1016, columns 1018 and keys 1020. Also, as is known, each table 1016 is an aggregation of columns. As can be seen, various mappings are provided between various elements of the ontological meta-model 1000 in relational meta-model 1002. For instance, in an embodiment, one or more columns of a table are mapped to an attribute of the ontological meta-model 1000. Likewise, tables 1016 are mapped to classes 1008 of the ontological meta-model 1000. As keys 1020 define relationships between tables 1016 in the relational meta-model, keys of the relational meta-model 1002 are mapped to relations of the ontological meta-model 1010 in a manner preserving the relationships between the tables 1016. In an embodiment, relational data types 1022 are mapped to a ontological data types 1012.

In an embodiment, the relational meta-model may be implemented using a relational database management system (RDBMS) and the meta-data in the relational meta-model is, therefore, readily available. The mapping shown in FIG. 10, in an embodiment, may also be achieved by utilizing Application Programming Interfaces (APIs) exposed by the systems implementing the relational meta-model 1002, such as Java Database Connectivity (JDBC) meta-data, Open Database Connectivity (ODBC) meta-data, and the like.

Figure 11:
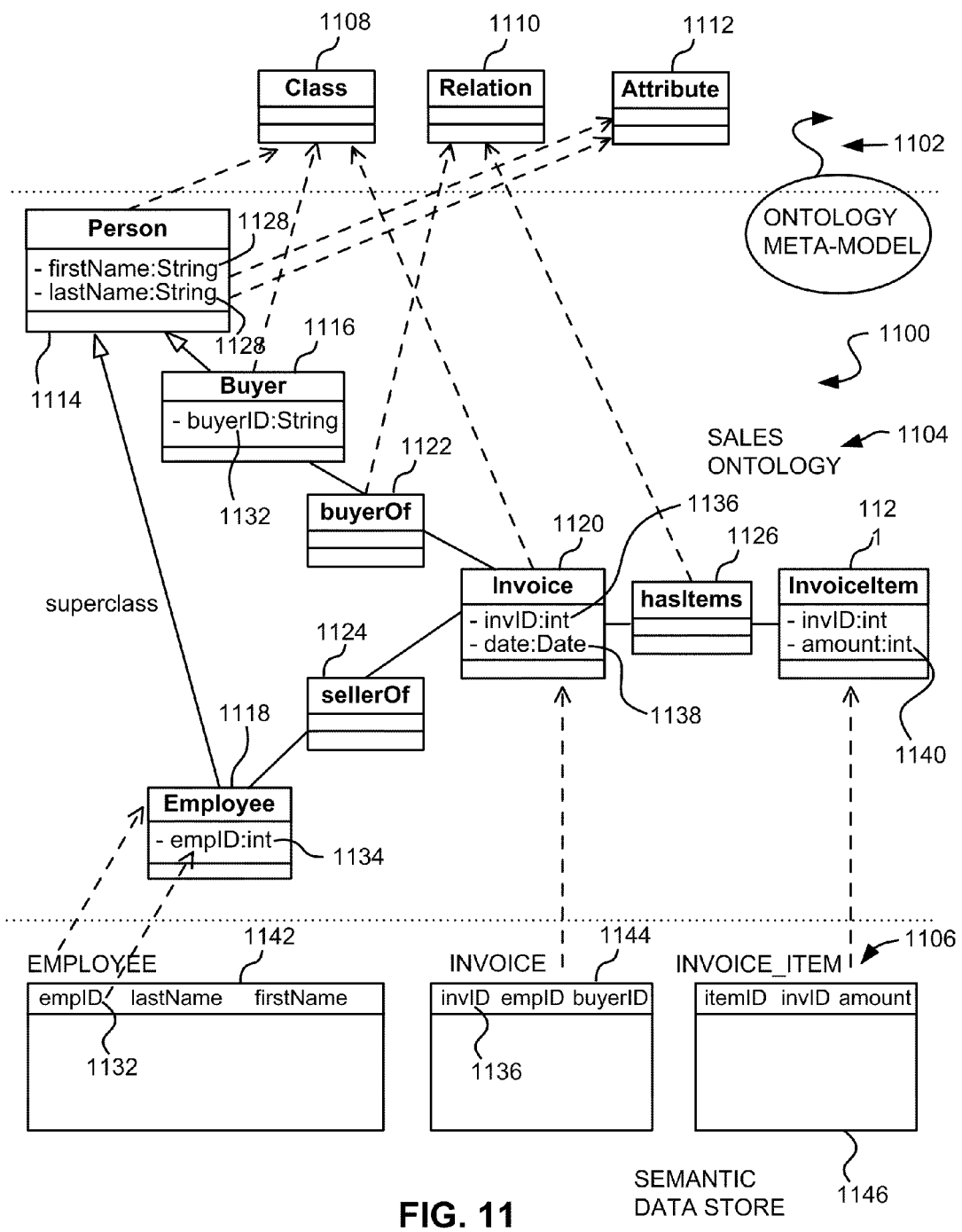
FIG. 11 shows an diagrammatic representation of a semantic data store and the relationships between the semantic data store, an ontology, and an ontological meta-model, where the semantic data store may be created using the mappings of FIG. 11.

FIG. 11 shows an example fragment 1100 from a sales ontology data store that provides an illustrative example how an ontology meta model 1102, sales ontology 1104, and semantic data store 1106 may relate, in accordance with an embodiment. In an embodiment, the semantic data store 1106 is used to store and maintain the instance data that is modeled by one or more ontologies and that has been imported, filtered, and merged from the business data sources, such as those described above in connection with FIG. 9. In an embodiment, in order to reason over transactional data with high performance, the semantic data store 1106 is formatted as a hyper-denormalized and vertically partitioned system. For example, data derived from n columns of an RDBMS table, in an embodiment, would be stored as n tables in the semantic data store 1106.

In an embodiment, the semantic data store translates policies (queries) expressed in terms of the sales ontology 1104 into queries expressed in terms of the semantic store schema, and executing the translated queries on the data store. The actual execution of the query may be delegated to a reasoner. Thus, in an embodiment, a query expressed in terms of classes and relations will be translated by the semantic data store 1106 in terms of tables and keys. For example, in an embodiment, the ontological query:

ONT: SELECT X.firstName, X.lastName will get translated into the semantic data source query:

SELECT firstName, lastName FROM Partition_1, Partition_2, . . . ,Partition_N.

In addition, appropriate relations may be substituted with foreign-key/primary-key pairings when the query is translated into the relational form.

As discussed above, the ontological meta-model is comprises of classes 1108, relations 1110 and attributes 1112. The sales ontology 1104 comprises specific instances of the members of the ontology meta-model 1102. For example, as shown, the sales ontology 1104 includes several classes including a person class 1114, a buyer class 1116 an employee class 1118, an invoice class 1120 and invoice item class 1121. As seen by it's name, the person class 1114 corresponds to people such as employees, buyers and other people. Accordingly, the buyer class 1116 and employee class 1118 are sub-classes of the person class 1114. Also clear from its name, the invoice class 1120 may be associated with invoices and the invoice item class 1121 may be comprised of various invoice items such as various products sold by a business employing the disclosed ontology. In an embodiment, the employee class 1118, invoice class 1120, and invoice item class 1121 have corresponding tables in the semantic data store 1106. Other classes of the sales ontology 1104 may also have corresponding tables in the semantic data store 1106.

As shown, the sales ontology 1104 includes various relations from the relations 1110, such as a buyerOf relation 1122 and a sellerOf relation 1124 and a hasItems relation 1126. The names of the various relations also may be related to their semantic meaning. For instance, as can be seen in the figure, a buyer of the buyer class 1116 may be related to an invoice of the invoice class 1120 by the relation buyerOf because the buyer may have purchased the particular items of the invoice. Likewise, an invoice of the invoice class 1120 is related to invoice items of the invoice item class 1121 by the relation hasItems 1126 because the invoice items were included on the invoice. Also, the sellerOf relation 1124 relates an employee of the employee class 1118 to an invoice of the invoice class 1120 when the employee was the person who sold the items listed on the invoice. In an embodiment, relations 1110 are represented in the semantic data store 1106 by the pairing of the primary key of the tables of the semantic data store 1106, as discussed below.

Further, various items of the sales ontology 1104 may include various members of the attribute class 1112. As an example, person 1114 may include a first name 1128 and a last name 1130, which as indicated in the drawing, may be stored as strings. Likewise, a buyer 1116 may have a buyerID unique to the buyer as may an employee 1118 have an employeeID 1134 unique to the employee. Continuing this example, the invoice 1120 may include an invoiceID 1136 unique to the invoice 1120 and a date 1138, for example, on which the invoice 1120 was created. As a final example, an invoice item of the invoiceItem class 1121 may include an amount corresponding to the price at which the associated item was sold to the buyer 1116.

As discussed above, various items of the sales ontology are stored in a semantic data store 1106. In an embodiment, the semantic data store 1106 may closely resemble a data store of another data model such as a relational database model. Thus, in an embodiment, the semantic data store 1106 includes a plurality of tables where each table corresponds to a class of the ontology meta-model 1102. It should be understood, however, that the example semantic data store 1106 shown in the drawings may be in an intermediate format used to facilitate transformation of the data. Data from the semantic data store 1106 may be further transformed, for example, into a format suitable for use with a particular reasoner operable to reason the data.

Thus, as shown in the illustrative example of FIG. 11, the semantic data store 1106 includes an employee table 1142, an invoice table 1144 and an invoice item table 1146. Each of the tables of the semantic data store 1106 may include a key comprising an attribute unique to the entities represented by the table. For instance, the employee table 1142 may include a column having each employee ID 1132. Other attributes may also be stored in tables such as the last name and first name attributes of employees in the employee table 1142. Likewise, the invoice table 1144 may include a column corresponding to an invoice ID primary key, employee ID foreign key and buyer ID foreign key such that in this manner, for example, an ID of an invoice may be located in the invoice table 1144 and the employee associated with the invoice and buyer to which items on the invoice are sold may be identified.

Figure 12:
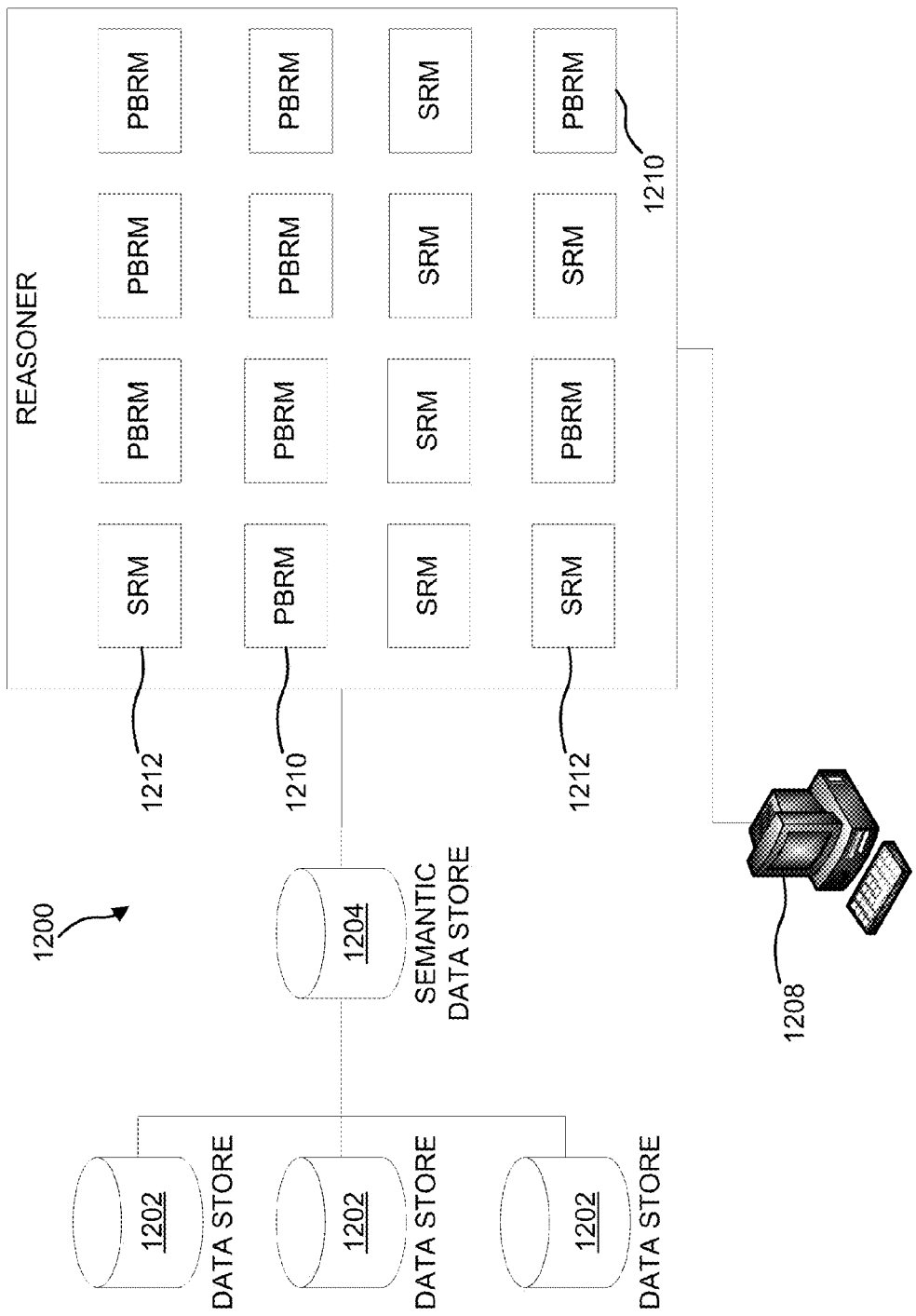
FIG. 12 shows a diagrammatic representation of a modular reasoning system in accordance with an embodiment.

The above embodiments, and variations thereof, provide advantages additional to those discussed above. FIG. 12 shows an environment 1200 in which embodiments of the invention may be practiced. As shown, the environment 12 includes a plurality of data stores 1202 from which data is extracted and stored in a semantic data store 1204. Extraction and storage of data from the data stores 1202 into the semantic data store 1204 may be performed in any suitable manner, including in accordance with the above disclosure. In an embodiment, data stored in the semantic data store 1204 is reasoned by a reasoner 1206, which is operated by a user of a user terminal 1208, in accordance with an embodiment. While the drawing shows the reasoner 1206 analyzing data from a single semantic data store 1204, the reasoner 1206 may utilize data from multiple semantic data stores as well as from one or more of the data stores 1202, or data from other sources.

The semantic data store 1204, in an embodiment, is a data store whose persistence mechanism is be the file system, database, or memory, depending on the usage within the application and, as described above. Further, the semantic data store 1204 may be dynamically optimized for storage of data based on deployed semantic domain definitions. As described above, semantic domain definitions may be OWL files that encapsulate domain taxonomy, which may be defined by a business expert for any particular domain.

In addition, it should be noted that FIG. 12 shows a simplified environment for the purposes of illustration, but that actual implementations may utilize various components in addition to that which is illustrated. For example, in an embodiment, the reasoner 1206 is implemented in one of several layers of a software architecture adapted for enforcing policies. As an example, an interface, such as a Web 2.0 interface may be provided for users to operate various components. Customized interfaces may be created using REST Web Services. One or more interfaces may be used to operate application services which coordinate various components of policy enforcement, such as a policy engine that operates the reasoner 1206 and the semantic data store 1204, data services that coordinate the transfer of data to the semantic data store 1204, and report services that provide reporting documents based on analysis of data in the semantic data store 1204, and the like. In an embodiment, the data services utilize Oracle Data Integrator 11gR1 and the report services utilize Oracle Business Intelligence Publisher, both available from Oracle Corporation.

As shown in the drawing, the reasoner 1206 comprises a plurality of reasoning modules, where each reasoning module applies a set of rules to analyze data in the semantic data store 1204. While FIG. 12 shows a certain number of reasoning modules of the reasoner 1206, the reasoner 1206 may have more or less reasoning modules. When reasoning data, the reasoner may use all or some of its reasoning modules, depending on the type of reasoning being conducted. For instance, a user may, through an input device, define a particular analysis that he or she would like to perform, and the reasoner may use one or more applicable modules, such as in a manner described below. Further, a user may define his or her own reasoning modules, which may include a combination of some of the reasoning modules of the reasoner 1206 directed to analyze data in a particular manner.

In an embodiment, the reasoner includes one or more pattern-based reasoning modules 1210 (abbreviated as PBRM) and one or more semantic reasoning modules 1212 (abbreviated as SRM). In an embodiment, a PBRM 1210 is a subreasoner of the reasoner 1206 that uses a predefined statistical analysis on data from the semantic data store in order to infer information from the data. PBRMs may utilize range reasoning where data is looked at over a specified range, such as over a specified time period. As an example, utilizing a matrix-based approach, such as the approach described above, a covariance matrix of a vector may be constructed in order to measure how the changes of variables in the vector depend on others. Likewise, the covariance of two variables may be measured for other objects, such as matrices or higher-dimensional objects. Correlation between two seemingly random variables, such as between invoice amounts and payments unrelated to the invoices, may signify fraud. A PBRM may take as input a set of data, such as a sampling of numerical values (such as invoice line items) over a time period, and may output conclusions based on a statistical analysis of the numerical values, such as covariance matrices or other objects.

Other statistical techniques may be used in PBRMs. For instance, pattern recognition may be used to identify activities that are out of the ordinary. As an example, certain invoices, payments, and or other items may be flagged for review if they contain an amount that is above or below a predefined threshold or if they deviate from a mean value for similar items by a predetermined amount. As another example, pattern recognition techniques may be used to flag invoices, payments, or other items that are not necessarily above or below a threshold, but that are otherwise abnormal, such as invoice amounts that are larger or smaller than usual, but not outside of a range that would cause any flags to be set. Pattern recognition may also be used to compare activity with activity of those having similar duties. For instance, pattern recognition may be used to identify, through analysis of purchases and/or other data, that a manager of a location is replacing parts on equipment more frequently than managers of other locations. An investigation may be subsequently made to determine whether the manager is legitimately acting differently than his or her peers, whether corrective action needs to be taken, and/or whether fraud is being committed, such as by profiting off the sale of used parts.

Generally, techniques that may be employed in PBRMs include: cross-correlation analysis to discover the relationship between multiple dependent variables; Bayesian filters to look at past events and build probabilistic models to predict future events to detect whether past, present, and/or future events violate a policy; and wavelets for detection of data that is most likely to be suspect. Other techniques may also be used and, as new techniques are developed, a user may define reasoning modules that are able to apply any given technique. For instance, in an embodiment, users may define techniques that may be employed by a PBRM using combinations of the above techniques and/or defining additional techniques.

As discussed, one or more SRMs 1212 may be used in connection with one or more PBRMs in order to increase the effectiveness of the modules. In an embodiment, an SRM is a reasoning module that applies one or more rules to a set of data to provide information about the relationships among the various data. Data for a SRM may be encoded into a matrix form, such as described above. A semantic reasoning module may, for example, identify all invoices related to a particular employee.

Generally, use of SRMs and PBRMs provides increased flexibility in choosing the data to be analyzed and the techniques to be used for analysis. For instance, output of one or more SRMs may be used as input for one or more PBRMs. As an example, if John Doe is an employee, a SRM may be used to identify invoices issued by John Doe, such as using any of the techniques, or variations thereof, discussed above. One or more covariance techniques may be used by one or more PBRMs to determine whether there is a correlation between the invoice amounts and other data. An SRM may be used to exclude from the analysis data that should be correlated to the invoice amounts, such as payments to the vendors identified on the invoices. An SRM may take as input objects from the semantic data store, may construct appropriate matrices, and may perform matrix operations on the matrices depending on the nature of the reasoning being performed, although matrices may be input into SRMs in other embodiments. Output from an SRM may be a set of inferences, or other conclusions, about the relationship among semantic data, may be a set of numerical values (such as invoice line items), or other data.

Likewise, the output of one or more PBRMs may be used as input to one or more SRMs. For instance, as discussed, PBRMs may be used to find correlations among various data. A SRM may be used to provide useful information about data having correlations, such as people, roles, vendors, and others associated with a particular datum. This information may be viewed by an analyst who may decide whether to investigate further and/or take corrective action. Additionally, the information may be used in order to define rules for additional analysis. The reasoner 1206 may include additional logic to coordinate the flow of data among reasoning modules being used, such as by formatting output of one reasoning module into a format suitable as input for another reasoning module. For instance, if an SRM outputs a set of inferences, the reasoner 1206 may extract from a semantic data store objects (such as numerical values corresponding to objects associated with the inferences) and provide those values to a PBRM for processing by the PBRM. In one embodiment, each reasoning module has a corresponding input type and output type. A reasoning module with a particular input type may accept information from another reasoning module with an output type that matches the particular input type. In an embodiment, each reasoning module of the reasoner has an output type that matches the input type of the other reasoning modules.

As discussed in the preceding paragraphs, SRMs and PBRMs may be used in series (where output of one or more modules is used as input for one or more other modules). SRMs and PBRMs may also be used in parallel in appropriate circumstances. For instance, output of an SRM and output of a PBRM may together be used as input for one or more other modules, each of which may be an SRM or PBRM. Additionally, while the above discussion pertains to SRMs and PBRMs, other types of modules may be employed. In an embodiment, one or more hybrid modules may be used in ways discussed above, where a hybrid module is a reasoning module that employs both semantic reasoning (such as transitive reasoning of semantic data) and statistical reasoning (such as pattern-based reasoning of numerical data). A hybrid module may comprise a combination of one or more SRMs and/or PBRMs in series and/or parallel.

Figure 13:
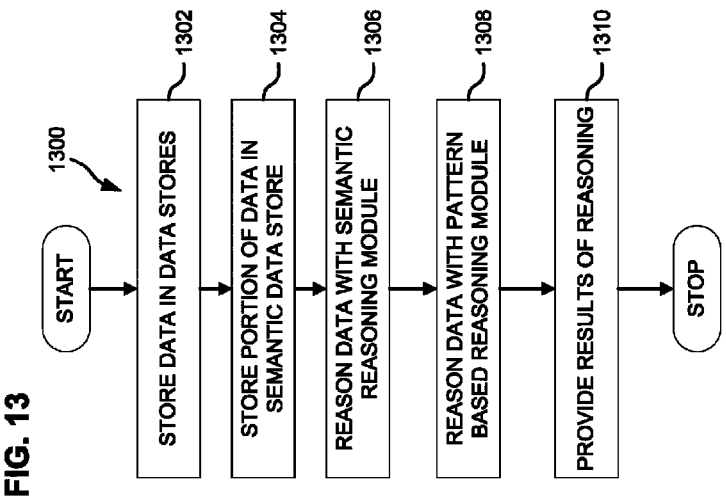
FIG. 13 shows a method for modularly reasoning data in accordance with an embodiment.

FIG. 13 illustrates steps of a method 1300 for reasoning data, in accordance with an embodiment. As with any method disclosed herein, or variations and/or combinations thereof, the method 1300 may be performed under the control of one or more computer systems configured with executable instructions and may be embodied on a computer readable medium. In an embodiment, at a data storage step 1302, data is stored in one or more data stores, such as during normal operations of an organization, as described above. As noted above, data may be stored in a plurality of data stores that utilize various methods of storing data, such as methods for storing data in a relational database, in flat files, and the like.

In accordance with an embodiment, at a semantic data storage step 1304, at least a portion of the data stored in the one or more data stores is stored in a semantic data store, such as a semantic data store configured as described above. As discussed, storing data in the semantic data store may involve the use of various filters in order to exclude some data from the one or more data stores and also may involve the use of various transformations of the data that put the data in a form suitable for storage in the semantic data store, such as in a manner described above. In addition, while the method 1304 describes a single semantic data store, more than one semantic data store may be utilized.

At a semantic reasoning step 1306, in an embodiment, data from the semantic data store is reasoned using a SRM, where the SRM may be as described above. For instance, a SRM may apply transitive reasoning to data in the semantic data store in order to identify relationships specified by a user of a system employing the method 1300, such as all invoices associated with a particular employee and/or having particular attributes. Semantic reasoning may include construction of one or more matrices or other objects whose entries represent some significance in the data, such as an amount, or a 0 or 1 as described above. Once the matrix or matrices are constructed, semantic reasoning may include applying matrix operations and/or other analysis to the matrices, depending on the particular type of reasoning being performed. At a statistical reasoning step 1308, data from the semantic data store is reasoned using a PBRM, in accordance with an embodiment. For instance, a PBRM may apply statistical reasoning to data specified by a user, such as to particular invoice values for the invoices identified by the SRM. As with the semantic reasoning step 1306, the statistical reasoning step may include construction and/or operations and/or other analysis on one or more matrices whose entries have a significance to the data.

While the method shows the semantic reasoning step 1306 performed before the statistical reasoning step 1308, the steps may be performed in another order or at the same time, as described above. For example, a PBRM may be used to identify suspicious values in the Semantic data store and a SRM may then identify employees and other semantic objects associated with the suspicious values. Further, also described above, a plurality of SRMs and/or PBRMs may be used to reason data in the semantic data store and may reason data in series and/or in parallel. Also, reasoning modules other than SRMs and PBRMs may be used as well. In order to provide customizability and/or scalability, each reasoning module may be adaptable to receive as input from other reasoning modules. For instance, operations in an embodiment where matrices are used, such as those described above, the dimensions of a matrix output by a reasoning module, which may vary based on the amount of data being reasoned, are used by another reasoning module so that operations on the matrix by the other reasoning module proceed properly.

In an embodiment, at a results step 1310, results of the reasoning are provided to a user of a system employing the method 1300. Providing the results may include causing the display of information corresponding to the results through a graphical user interface of the system. The results may be presented in various forms which may employ text, graphics, video, audio, and other features. For example, graphs that illustrate statistical relationships between semantic objects may be displayed, as may text describing the relationships.

Figure 14:
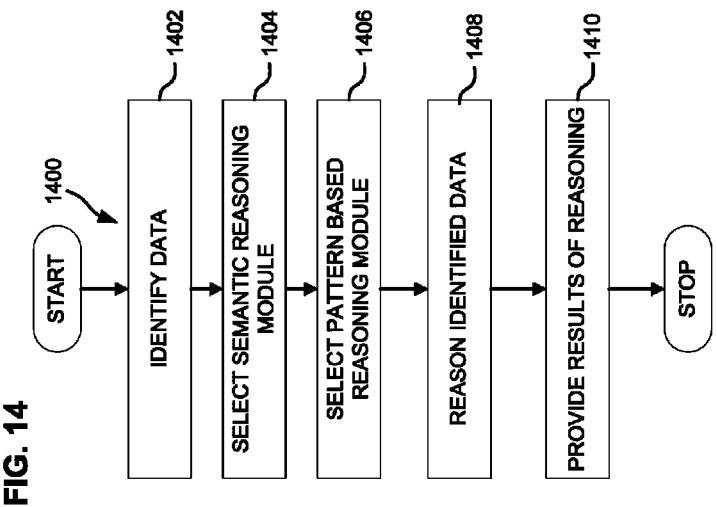
FIG. 14 shows a method for modularly reasoning data in accordance with another embodiment.

FIG. 14 shows a method 1400 for directing reasoning of semantic data, in accordance with an embodiment. The method 1400 may be performed under the control of a user interacting with a graphical user interface. At a data identification step 1402, data is identified in accordance with an embodiment. For instance, a user may specify through an interface data in which he or she is interested and, based at least in part on input from the user, appropriate data is identified. Identifying data may include specifying types of semantic objects, such as invoices, and identifying corresponding data in the semantic data store, such as specific invoices created by employees of an organization. One or more attributes of semantic object types may also be specified, such as ranges for values on invoices, employees or a certain rank, and the like.

In an embodiment, at a SRM selection step 1404, an SRM is selected. Selection of the SRM may be based at least in part on user input. For example, if a user specifies that he or she would like to analyze all invoices belonging to a particular employee or group of employees, an SRM configured to identify invoices associated with the employee(s) may be selected. At a PBRM selection step 1406, in an embodiment, a PBRM is selected. As with the SRM, selection of the PBRM may be based at least in part on user input. For example, if a user specifies that he or she would like to analyze the correlation between invoice values and other semantic objects, a PBRM operable to perform this analysis may be selected. For instance, a PBRM that constructs a covariance matrix from vectors in a matrix constructed in accordance with the above description may be selected.

While FIG. 14 shows the SRM selection step 1404 occurring before the PBRM selection step 1406, the steps may be performed in another order or at the same time. In addition, as discussed above, embodiments of the present invention provide for scalability. Accordingly, the method 1400 may include selection of a plurality of SRMs and/or a plurality of PBRMs.

At a data reasoning step 1408, the identified data is reasoned according to the selected SRMs and PBRMs, in accordance with an embodiment. Reasoning the data may include applying any selected SRMs and PBRMs in an order that is based at least in part on user input. At a results step 1410, results of the reasoning are provided, such as in a manner described above.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A method of reasoning data, comprising:
under the control of one or more computer systems configured with executable instructions,
storing data in a data store;

reasoning the data using at least one semantic reasoning module and at least one pattern-based reasoning module in series with the semantic reasoning module to determine a conclusion; and causing information related to the conclusion to be displayed, wherein reasoning the data includes using output of one of the semantic reasoning module and pattern-based reasoning module as input of the other of the semantic reasoning module and pattern-based reasoning module.

2. The method of claim 1, wherein the data store is a semantic data store.

3. The method of claim 1, further comprising receiving a selection of said at least one semantic reasoning module and of said at least one pattern-based reasoning module from a user, said selection from a plurality of potential semantic reasoning modules and potential pattern-based reasoning modules.

4. A method of reasoning data, comprising:
under the control of one or more computer systems configured with, executable instructions,
storing data in a data store;
reasoning the data using at least one semantic reasoning module and at least one pattern-based reasoning module in series with the semantic reasoning module to determine a conclusion;
causing information related to the conclusion to be displayed; and
receiving from a user instructions for defining a particular semantic reasoning module that incorporates said at least one semantic reasoning module.

5. A method of reasoning data, comprising:
under the control of one or more computer systems configured with executable instructions,
storing data in a data store;
reasoning the data using at least one semantic reasoning module and at least one pattern-based reasoning module in series with the semantic reasoning module to determine a conclusion;
causing information related to the conclusion to be displayed; and
receiving from a user instructions for defining a particular pattern-based reasoning module that incorporates said at least one pattern-based reasoning module.

6. A system for reasoning data, comprising:
a data store; and
one or more processors collectively operable to perform analysis on data from the data store according to a reasoner that includes one or more semantic reasoning modules and one or more pattern-based reasoning modules in series with the one or more semantic reasoning modules,
wherein the reasoner comprises at least one pattern-based reasoning module in parallel with at least one other pattern-based reasoning module.

7. The system of claim 6, wherein the data store is a semantic data store.

8. A system of reasoning data, comprising:
a data store;
one or more processors collectively operable to perform analysis on data from the data store according to a reasoner that includes one or more semantic reasoning modules and one or more pattern-based reasoning modules in series with the one or more semantic reasoning modules; and
an operational data store from which data in the semantic data store is extracted.

9. A system of reasoning data, comprising:
a data store; and
one or more processors collectively operable to perform analysis on data from the data store according to a reasoner that includes one or more semantic reasoning modules and one or more pattern-based reasoning modules in series with the one or more semantic reasoning modules,
wherein the reasoner is adapted to be scalable with the addition of one or more additional semantic reasoning modules or additional pattern-based reasoning modules.

10. A non-transitory computer readable storage medium having stored thereon instructions for causing one or more processors to reason data, the instructions including instructions that:
cause the one or more processors to cause storage of data in a data store;
cause the one or more processors to reason the data using a reasoner to determine a conclusion, the reasoner comprising at least one semantic reasoning module and at least one pattern-based reasoning module in series with the semantic reasoning module;
cause the one or more processors to receive a selection of said one or more semantic reasoning module and of said one or more pattern-based reasoning module from a user, said selection from a plurality of potential semantic reasoning modules and potential pattern-based reasoning modules; and
cause information related to the conclusion to be displayed.

11. The computer readable storage medium of claim 10, wherein the data store is a semantic data store.

12. The computer readable storage medium of claim 10, wherein the instructions cause the one or more processors to use output of one of the one or more semantic reasoning modules for input to the one or more pattern-based reasoning modules.

13. The computer readable storage medium of claim 10, wherein the instructions cause the one or more processors to use output of one of the one or more pattern-based reasoning modules for input to the one or more semantic reasoning modules.

14. The computer readable storage medium of claim 10, further comprising instructions that cause the one or more processors to receive from a user instructions for defining a particular semantic reasoning module that incorporates said at least one semantic reasoning module.

15. The computer readable storage medium of claim 10, further comprising instructions that cause the one or more processors to receive from a user instructions for defining a particular pattern-based reasoning module that incorporates said at least one pattern-based reasoning module.

16. The computer readable storage medium of claim 10, wherein the reasoner is scalable by the addition of one or more additional semantic reasoning modules and/or pattern-based reasoning modules.

17. The method of claim 1, wherein the reasoning includes using at least one pattern-based reasoning module in parallel with at least one other pattern-based reasoning module.

18. The method of claim 4, wherein the reasoning includes using at least one pattern-based reasoning module in parallel with at least one other pattern-based reasoning module.

19. The method of claim 5, wherein the reasoning includes using at least one pattern-based reasoning module in parallel with at least one other pattern-based reasoning module.

20. The system of claim 8, wherein the reasoner comprises at least one pattern-based reasoning module in parallel with at least one other pattern-based reasoning module.

21. The system of claim 9, wherein the reasoner comprises at least one pattern-based reasoning module in parallel with at least one other pattern-based reasoning module.

22. The computer readable storage medium of claim 10 wherein at least one pattern-based reasoning module is arranged in parallel with at least one other pattern-based reasoning module.

\* \* \* \* \*

UNITED STATES PATENT AND TRADEMARK OFFICE
CERTIFICATE OF CORRECTION

| | | |
|---|---|---|
| PATENT NO. | : 8,560,491 B2 | Page 1 of 1 |
| APPLICATION NO. | : 12/874821 | |
| DATED | : October 15, 2013 | |
| INVENTOR(S) | : B'Far et al. | |

It is certified that error appears in the above-identified patent and that said Letters Patent is hereby corrected as shown below:

On the Title Page

On page 2, column 1, item [56] under "Other Publications", line 12-13, delete "definitions" and insert -- definition --, therefor.

On page 2, column 1, item [56] under "Other Publications", line 21, delete "database" and insert -- Databases --, therefor.

In the Specification

Column 9, line 13, delete "Janjay" and insert -- Sanjay --, therefor.

Column 17, line 67, delete "columns" and insert -- columns. --, therefor.

Column 22, line 28, delete "and or" and insert -- and/or --, therefor.

In the Claims

Column 27, line 21, in Claim 4, delete "with," and insert -- with --, therefor.

Signed and Sealed this
Third Day of June, 2014

Michelle K. Lee
*Deputy Director of the United States Patent and Trademark Office*